(12) United States Patent
Yamasaki

(10) Patent No.: US 9,383,757 B2
(45) Date of Patent: Jul. 5, 2016

(54) AIRCRAFT CONTROL DEVICE, AIRCRAFT, AND METHOD FOR CONTROLLING AIRCRAFT

(71) Applicant: MITSUBISHI HEAVY INDUSTRIES, LTD., Tokyo (JP)

(72) Inventor: Koichi Yamasaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/430,765

(22) PCT Filed: Oct. 29, 2013

(86) PCT No.: PCT/JP2013/079324
§ 371 (c)(1),
(2) Date: Mar. 24, 2015

(87) PCT Pub. No.: WO2014/083993
PCT Pub. Date: Jun. 5, 2014

(65) Prior Publication Data
US 2015/0234388 A1 Aug. 20, 2015

(30) Foreign Application Priority Data

Nov. 29, 2012 (JP) .................................. 2012-261546
Jul. 18, 2013 (JP) .................................. 2013-149449

(51) Int. Cl.
*G05D 1/10* (2006.01)
*F41G 7/00* (2006.01)
(52) U.S. Cl.
CPC ............... *G05D 1/104* (2013.01); *F41G 7/006* (2013.01); *G05D 1/107* (2013.01)
(58) Field of Classification Search
CPC .................................... G05D 1/10; F41G 7/00
USPC ......................................................... 701/302
See application file for complete search history.

(56) References Cited

U.S. PATENT DOCUMENTS 6,467,388 B1 * 10/2002 Malakatas ................. F41G 3/04
235/411
6,842,674 B2 * 1/2005 Solomon ............... B64C 39/024
342/350

(Continued)

FOREIGN PATENT DOCUMENTS

CN 1332854 1/2002
JP 2-254298 10/1990

(Continued)

OTHER PUBLICATIONS

International Search Report issued Jan. 28, 2014 in International Application No. PCT/JP2013/079324.

(Continued)

*Primary Examiner* — Thomas Tarcza
*Assistant Examiner* — Alex C Dunn
(74) *Attorney, Agent, or Firm* — Wenderoth, Lind & Ponack, L.L.P.

(57) ABSTRACT

An aircraft control device determines, on the basis of relative positional relations between an individual aircraft and a target aircraft, a role of the individual aircraft with respect to the target aircraft, and a trajectory of the individual aircraft based on control operations determined according to the role of the individual aircraft. As an example, the aircraft control device represents the role of the individual aircraft with respect to the target aircraft as a numerical value and changes the role of the individual aircraft a plurality of times by changing the numerical value. Every time the role of the individual aircraft is changed, a minimum distance to target is calculated for the individual aircraft, and the role of the individual aircraft having the largest minimum distance to target is determined as the role of the individual aircraft.

17 Claims, 24 Drawing Sheets

(56) References Cited

U.S. PATENT DOCUMENTS

| | | | |
|---|---|---|---|
| 7,154,732 B2* | 12/2006 | Bennett | B60R 21/0173 307/9.1 |
| 8,600,587 B1* | 12/2013 | Seah | G08G 5/0091 701/10 |
| 2004/0068351 A1* | 4/2004 | Solomon | F41H 13/00 701/24 |
| 2004/0068415 A1* | 4/2004 | Solomon | G05D 1/0088 89/1.11 |
| 2006/0284050 A1* | 12/2006 | Busse | G01J 1/4228 250/203.1 |
| 2009/0173789 A1 | 7/2009 | Howard | |
| 2009/0224097 A1* | 9/2009 | Kariv | B64F 1/06 244/63 |
| 2012/0228379 A1 | 9/2012 | Ranat et al. | |
| 2014/0249744 A1* | 9/2014 | Andersson | G01C 21/3415 701/410 |
| 2014/0249745 A1* | 9/2014 | Brege | F41H 13/00 701/411 |

FOREIGN PATENT DOCUMENTS

| | | |
|---|---|---|
| JP | 2002-329158 | 11/2002 |
| JP | 3736112 | 1/2006 |
| JP | 2007-93045 | 4/2007 |
| JP | 2009-8825 | 1/2009 |
| JP | 2010-2172 | 1/2010 |
| JP | 2012-179984 | 9/2012 |
| JP | 2012-207847 | 10/2012 |
| WO | 2007/020477 | 2/2007 |
| WO | 2011/018656 | 2/2011 |

OTHER PUBLICATIONS

Written Opinion of the International Searching Authority issued Jan. 28, 2014 in International Application No. PCT/JP2013/079324.
How to live & die in the virtual sky, pp. 7-8, 1999.
Learning and Its Algorithm, Aug. 28, 2002 (with excerpt translation).
The First Office Action issued Oct. 27, 2015 in corresponding Chinese Application No. 201380050229.X (with English translation).
Extended European Search Report issued Apr. 29, 2016 in corresponding European Application No. 13857884.4.

* cited by examiner

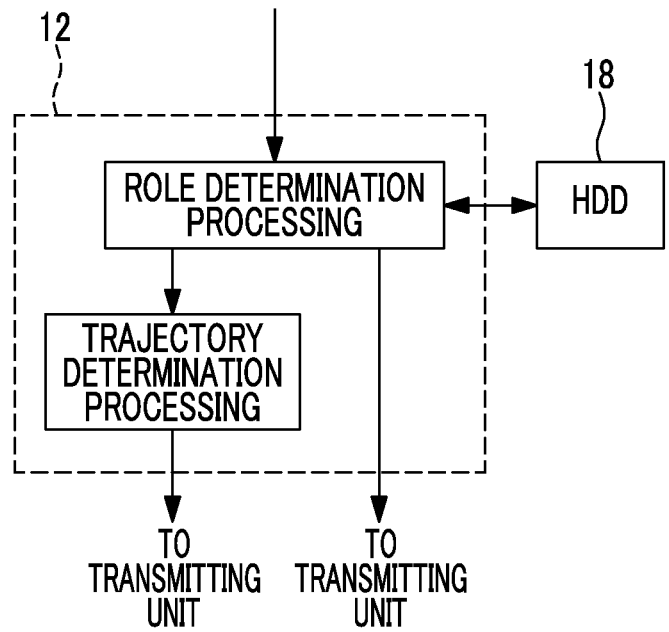

FIG. 25
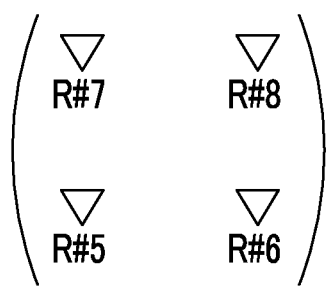
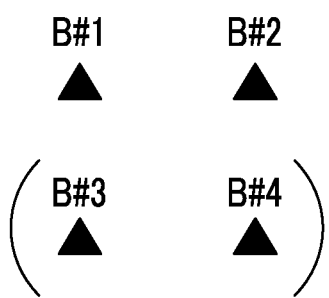

AIRCRAFT CONTROL DEVICE, AIRCRAFT, AND METHOD FOR CONTROLLING AIRCRAFT

BACKGROUND OF INVENTION

1. Field of Invention

The present invention relates to an air control device, an aircraft, and a method for controlling an aircraft.

2. Description of Related Art

An effective firing control should be performed when a plurality of aircraft shoot a target and perform enemy detection or tracking for the shooting.

For example, Japanese Unexamined Patent Application Publication No. 2012-179984 discloses a control device of an aircraft in which, on the basis of movement information and target information of an accompanying aircraft received by a data link device and movement information of a host aircraft and target information obtained by enemy detection or tracking of the host aircraft, allocation processing which allocates the target aircraft which is an object of the shooting or the target aircraft which is an object of the enemy detection and the tracking is performed on the host aircraft and the accompanying aircraft, and a target allocation instruction which is the allocation result is transmitted to accompanying aircraft by the data link device.

Technical Problem

However, in order to perform effective action of aircraft in a formation with respect to a target aircraft, not only determination of a more appropriate role of the aircraft with respect to the target aircraft but also determination of an appropriate trajectory of the aircraft for performing the role is required.

SUMMARY OF INVENTION

The present invention is made in consideration of the above-described circumstances, and an object thereof is to provide an aircraft control device, an aircraft, and a method for controlling an aircraft capable of appropriately and easily determining roles and trajectories of a plurality of aircraft in a formation with respect to a target aircraft.

Solution to Problem

In order to solve the above-described problems, an aircraft control device, an aircraft, and a method for controlling an aircraft of the present invention adopt the following means.

According to a first aspect of the present invention, there is provided an aircraft control device which obtains roles of a plurality of aircraft in a formation and trajectories of the aircraft, including: calculation means for determining, on the basis of relative positional relations between the aircraft and a target aircraft, a role of the individual aircraft with respect to the target aircraft, and a trajectory of the individual aircraft based on control operations determined according to the role of the individual aircraft; and transmitting means for transmitting the role of the aircraft and the trajectory of the aircraft determined by the calculation means to the corresponding individual aircraft.

According to the present configuration, the aircraft control device obtains the roles of the plurality of aircraft in a formation and the trajectories of the aircraft. For example, the roles of the aircraft include detection for or tracking of the target aircraft, guidance of a missile, and projection of the missile.

In addition, on the basis of the relative positional relations between the aircraft and the target aircraft, the role of the individual aircraft with respect to the target aircraft and the trajectory of the individual aircraft based on an action plan predetermined according to the role of the individual aircraft are determined by the calculation means. The relative positional relations between the aircraft and the target aircraft also include an azimuth angle between the aircraft and the target aircraft. In addition, the trajectory of the aircraft based on the control operation determined according to the role is also determined by the relative positional relations between the aircraft and the target aircraft.

Moreover, the determined role and trajectory of the aircraft is transmitted to the corresponding individual aircraft by the transmitting means.

In this way, in the present configuration, since the role and the trajectory of the aircraft are determined based on the relative positional relations between the aircraft and the target aircraft, it is possible to appropriately and easily determine the role and trajectory of the plurality of aircraft in a formation with respect to the target aircraft.

In the first aspect, preferably, the calculation means performs first determination processing in which the role of the aircraft is determined, according to an evaluation value based on an azimuth angle between the aircraft and the target aircraft.

According to the present configuration, the direction of the aircraft with respect to the target aircraft is an important element in the projection of the missile, the enemy detection, or the tracking, and it is possible to easily determine an optimal role of the aircraft.

In the first aspect, preferably, the first determination processing applies a high evaluation value as a role of projecting a missile if the aircraft is an aircraft in which an amount of change of the azimuth angle required for opposing the aircraft to the target aircraft is small, gives a high evaluation value as a role of guiding the missile if the aircraft is an aircraft in which the target aircraft and the missile are positioned near an end of a guidance range of the missile, and gives a high evaluation value as a role of detecting or tracking the target aircraft if the aircraft is an aircraft in which the target aircraft is positioned near an end of an enemy detection range of the aircraft.

According to the present configuration, since loss of energy in the aircraft is increased as the amount of the change of the azimuth angle is increased, the aircraft in which the amount of the change of the azimuth angle required for opposing the aircraft to the target aircraft is smaller takes the role of projecting the missile. In addition, since it is preferable to capture the target aircraft and the missile near the end of the guidance range of the missile of the aircraft, the aircraft in which the target aircraft and the missile are positioned at the end around the guidance range of the missile of the aircraft takes the role of guiding the missile. In addition, since it is preferable to capture the target aircraft near an end of the enemy detection range of the aircraft, the aircraft in which the target aircraft is positioned near the end of the enemy detection range of the aircraft takes the role of performing detection for and tracking of the target aircraft. Therefore, according to the present configuration, it is possible to determine a more optimal role for the aircraft.

In the first aspect, preferably, the aircraft control device further includes storage means for storing a plurality of rules which indicates the role of the aircraft corresponding to the relative positional relations between the aircraft and the target aircraft, and the calculation means performs second determination processing in which the rule corresponding to the relative positional relations between the target aircraft and the aircraft is selected from the storage means and the role of the aircraft is determined from the selected rule.

According to the present configuration, the plurality of rules indicating the role of the aircraft corresponding to the relative positional relations between the aircraft and the target aircraft are stored in the storage means. For example, the rule is an IF-THEN rule, the relative positional relations between the aircraft and the target aircraft are represented by IF, and the role of the aircraft according to IF is represented by THEN.

In addition, since the rule corresponding to the relative positional relations between the aircraft and the target aircraft is selected from the storage means, and the role of the aircraft is determined from the selected rule, according to the present configuration, it is possible to determine a more optimal role for the aircraft during a short processing time.

In the first aspect, preferably, the rule indicates the role of the aircraft corresponding to the relative positional relations between the target aircraft and the aircraft and an index which indicates whether or not the missile reaches the target aircraft.

According to the present invention, since the rule is also selected based on whether or not the missile reaches the target aircraft, it is possible to determine a more optimal role for the aircraft.

In the first aspect, preferably, the rule indicates the role of the aircraft using a common name which does not specify each of the aircraft and the target aircraft without using a proper name which specifies the aircraft and the target aircraft.

According to the present configuration, since it is not necessary to generate the rules of the individual aircraft and the individual target aircraft, it is possible to reduce the number of the rules stored in the storage means.

In the first aspect, preferably, the rule is not only randomly generated but also arbitrarily generated in consideration of the determination of a pilot of the aircraft.

According to the present configuration, assurance of the rule is increased.

In the first aspect, preferably, a battle simulation in which a battle between the aircraft and the target aircraft is simulated is performed by continuously using the plurality of rules before being stored in the storage means along with elapsed times, and according to the rule used in the battle simulation, a score corresponding to achievement of a predetermined event in the battle simulation is added to the evaluation value of the rule, and the rule stored in the storage means is determined based on the evaluation value.

According to the present configuration, the battle simulation in which the battle between the aircraft and the target aircraft is simulated is performed by continuously using the plurality of rules before being stored in the storage means of the aircraft along with elapsed times. In addition, the rule stored in the storage means of the aircraft is determined by the battle simulation performed by a battle simulation device. For example, the battle simulation device which performs the battle simulation is provided in ground equipment, and it is possible to determine the rule which stores the battle simulation in the storage means of the aircraft in a sufficient amount of time.

In the rule used in the battle simulation, the score corresponding to the achievement of the predetermined event in the battle simulation is added to the evaluation value. The event is projection of the missile to the target aircraft, shooting-down of the target aircraft, or the like, and the role of the aircraft indicated by the rule capable of achieving the event indicates an appropriate role of the aircraft according to the situation.

Accordingly, in the present configuration, it is possible to store the appropriate rule for determining the role of the aircraft in the storage means of the aircraft.

In the first aspect, preferably, the score with respect to the rule in which the event is achieved is gradient-distributed in the rule which is used to reach the rule in which the event is achieved.

It is considered that the event can be achieved since not only the last used rule but also the rule used to achieve the event is appropriate. In the present configuration, the score indicating a contribution degree with respect to the achievement of the event is gradient-distributed to the rule used to achieve the event, and thus, it is possible to add a more appropriate score to the evaluation value of the rule.

In the first aspect, early generation creation processing may be performed in which aggregations of a predetermined number of the rules are set to one individual, and a predetermined number of the individuals is generated as an early generation, evaluation value calculation processing may be performed in which an evaluation value indicating superiority of the aircraft with respect to the target aircraft is calculated for each individual based on the trajectory of the aircraft determined by the battle simulation in which the battle between the aircraft and the target aircraft is simulated using a predetermined number of rules, the evaluation value calculation processing may be performed every time the rule configuring the individuals is changed and a new generation is set, and when the change of the rule reaches a predetermined generation, the rule stored in the storage means may be determined based on the individual having the highest evaluation value.

According to the present configuration, the aggregations of the predetermined number of the rules are set to one individual and the predetermined number of individuals is generated as the early generation by the early generation creation processing. Next, the evaluation value calculation processing is performed in which the evaluation value indicating the superiority of the aircraft with respect to the target aircraft is calculated for each individual based on the trajectory of the aircraft determined by the battle simulation in which the battle between the aircraft and the target aircraft is simulated using the predetermined number of rules.

In addition, the evaluation value calculation processing is performed every time the rule configuring the individuals is changed and a new generation is set, and when the change of the rule reaches a predetermined generation, the rule stored in the storage means is determined based on the individual having the highest evaluation value.

Accordingly, in the present configuration, it is possible to store the appropriate rule for determining the role of the aircraft in the storage means of the aircraft.

In the first aspect, elimination and addition may be performed based on the battle simulation in the rule configuring the individuals.

According to the present configuration, reproducibility of the evaluation value calculation processing is secured while corresponding to deficiency or overlapping of the rules configuring the individual.

In the first aspect, when two individuals are intersected so as to change the rule configuring the individuals, the intersection may be performed based on the individual in which the number of the configured rules is smaller.

According to the present configuration, the intersection is certainly performed even when the intersection is performed between two individuals in which the numbers of the rules configuring the individuals are different from each other.

In the first aspect, preferably, the calculation means performs third determination processing in which the role of the aircraft with respect to the target aircraft is represented by a numerical value, the role of the aircraft is changed a plurality of times by changing the numerical value, an evaluation value indicating superiority of the aircraft with respect to the target aircraft is calculated based on the role of the aircraft every time the role of the aircraft is changed, and the role of the aircraft is determined from the evaluation value.

According to the present configuration, since the role of the aircraft with respect to the target aircraft is represented by a numerical value and the role of the aircraft is changed a plurality of times by changing the numerical value, it is possible to easily generate a plurality of combinations of the aircraft and roles. The evaluation value indicating superiority of the aircraft with respect to the target aircraft is calculated based on the role of the aircraft every time the role of the aircraft is changed. In addition, the role of the aircraft is determined from the evaluation value.

Therefore, according to the present configuration, it is possible to determine a more optimal role for the aircraft.

In the first aspect, preferably, in the third determination processing, the role of the aircraft and an initial disposition position of the aircraft with respect to the target aircraft are represented by a numerical value, the role and the initial disposition position of the aircraft are changed by changing the numerical value, and the evaluation value is calculated every time the role and the initial disposition position of the aircraft are changed.

According to the present configuration, it is possible to easily determine the initial disposition position of the aircraft.

In the first aspect, preferably, in the third determination processing, the role of the aircraft and the trajectory of the aircraft are determined for each predetermined time interval.

In the first aspect, the evaluation value is calculated based on an estimation result of the trajectory of the target aircraft.

According to the present configuration, it is possible to accurately obtain the evaluation value.

According to the present configuration, a pilot of the aircraft easily understands the role and trajectory to be performed in time series.

In the first aspect, preferably, the calculation means performs fourth determination processing in which a battle simulation in which a battle between the aircraft and the target aircraft is simulated is performed every time the roles of the aircraft with respect to the target aircraft are combined, and the role of the aircraft and the trajectory of the aircraft are determined based on an evaluation value which is obtained from the simulation result and indicates superiority of the aircraft with respect to the target aircraft.

According to the present configuration, the battle simulation in which the battle between the aircraft and the target aircraft is simulated is performed every time the roles of the aircraft with respect to the target aircraft are combined. In addition, the role of the aircraft and the trajectory of the aircraft are determined based on an evaluation value which is obtained from the battle simulation result and indicates superiority of the aircraft with respect to the target aircraft.

Therefore, according to the present configuration, it is possible to determine a more optimal role for the aircraft.

In the first aspect, preferably, the calculation means performs the fourth determination processing so that only a predetermined number of aircraft corresponds to a predetermined number of target aircraft corresponding to a threat level when a required time of the battle simulation for combinations of all roles does not end within a predetermined time.

According to the present configuration, a load of the calculation means required for the fourth determination processing is decreased, and as a result, a time required for the role sharing verification processing is decreased.

In the first aspect, preferably, the calculation means determines one role and one trajectory among the roles of the aircraft and the trajectories of the aircraft obtained by at least two of the first determination processing, the second determination processing, the third determination processing, and the fourth determination processing, as the role of the aircraft and the trajectory of the aircraft.

According to a second aspect of the present invention, there is provided an aircraft including the above-described aircraft control device.

According to a third aspect of the present invention, there is provided a method for controlling an aircraft which obtains roles of a plurality of aircraft in a formation and trajectories of the aircraft, comprising: a first step of determining, on the basis of relative positional relations between the aircraft and a target aircraft, a role of the individual aircraft with respect to the target aircraft, and a trajectory of the individual aircraft based on control operations determined according to the role of the individual aircraft; and a second step of transmitting the determined role and trajectory of the aircraft to the corresponding individual aircraft.

Advantageous Effects of Invention

According to the present invention, it is possible to obtain excellent effects that roles and trajectories of a plurality of aircraft in a formation with respect to a target aircraft can be appropriately and easily obtained.

BRIEF DESCRIPTION OF DRAWINGS

FIG. 13 is a functional block diagram of an aircraft control device according to a second embodiment of the present invention.

FIG. 14 is a schematic diagram showing an IF text configuration and a THEN text configuration according to the second embodiment of the present invention.

FIG. 25 is a schematic diagram showing situations in which role sharing verification processing according to a fifth embodiment of the present invention is performed.

DESCRIPTION OF EMBODIMENTS

Hereinafter, embodiments of an aircraft control device, an aircraft, and a method for controlling an aircraft according to the present invention will be described with reference to the drawings.

First Embodiment

Hereinafter, a first embodiment of the present invention will be described.

Figure 1:
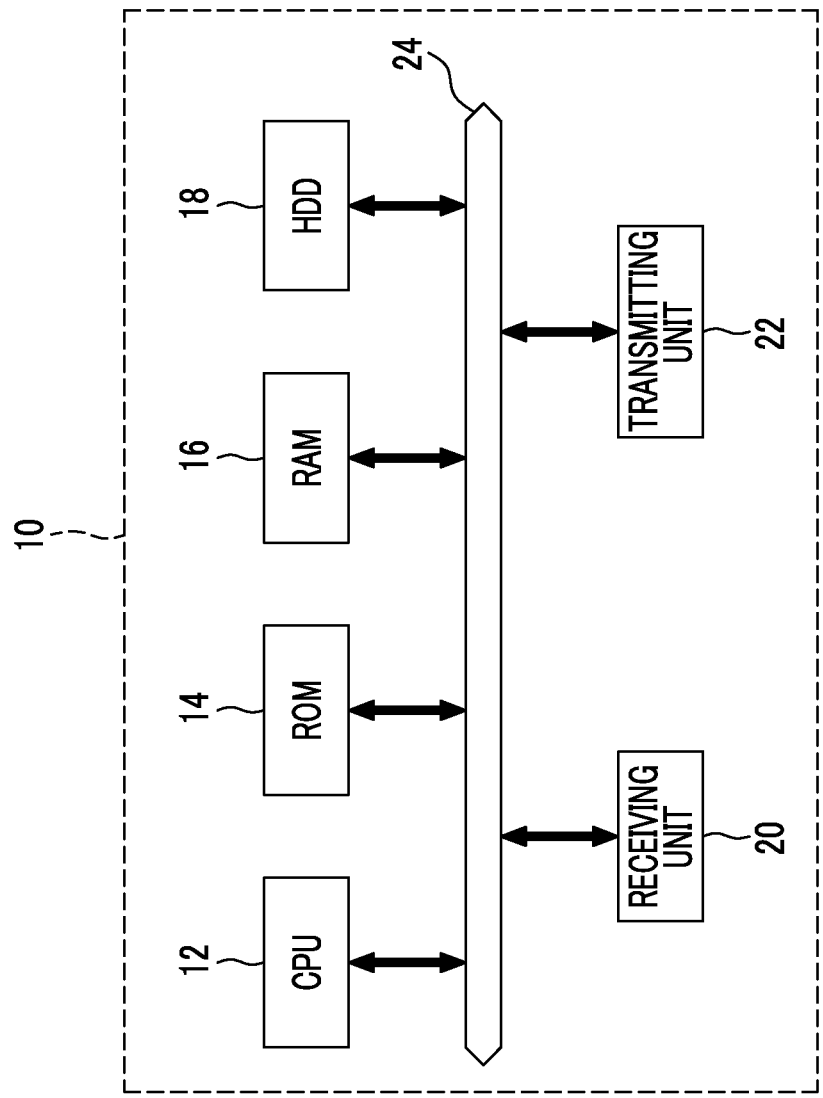
FIG. 1 is a block diagram showing an electrical configuration of an aircraft control device according to a first embodiment of the present invention.

FIG. 1 is a block diagram showing an electrical configuration of an aircraft control device 10 according the first embodiment. The aircraft control device 10 according to the first embodiment is a device which obtains roles of a plurality of aircraft 40 (refer to FIG. 2) in a formation and trajectories of the aircraft 40. In addition, the aircraft control device 10 is included in each of the aircraft 40.

The aircraft control device 10 according to the first embodiment includes a Central Processing Unit (CPU) 12 which performs various calculation processing, a Read Only Memory (ROM) 14 in which various programs carried out by the CPU 12, various pieces of information, or the like are stored in advance, a Random Access Memory (RAM) 16 which is used as a work area or the like when the various programs are carried out by the CPU 12, and a Hard Disk Drive (HDD) 18 which is storage means for storing various programs and various pieces of information such as an airframe specification or the like of the aircraft 40 which becomes an object of simulation.

In addition, the aircraft control device 10 includes a receiving unit 20 which receives various pieces of information such as accompanying aircraft information or information (hereinafter, referred to as "target aircraft information") related to a target aircraft 42 (refer to FIG. 2) obtained by enemy detection or tracking of the accompanying aircraft from the accompanying aircraft, and a transmitting unit 22 which transmits calculation results by the CPU 12 or host aircraft information to the accompanying aircraft. In addition, the accompanying aircraft information includes position information of the accompanying aircraft, the speed of the accompanying aircraft, or the like. The host aircraft information includes position information of the host aircraft, the speed of the host aircraft, or the like. The target aircraft information includes position information of the target aircraft 42, a speed of the target aircraft 42, or the like.

In this way, in the aircraft 40 according to the first embodiment, transmitting and receiving (data link) of various pieces of information can be performed between the aircraft 40. That is, according to the data link, the aircraft 40 are networked to share various pieces of information such as the host aircraft information, the accompanying aircraft information, the target aircraft information, or instruction information with respect to other aircraft 40.

The CPU 12, the ROM 14, the RAM 16, the HDD 18, the receiving unit 20, and the transmitting unit 22 are electrically connected to one another via a system bus 24.

Figure 2:
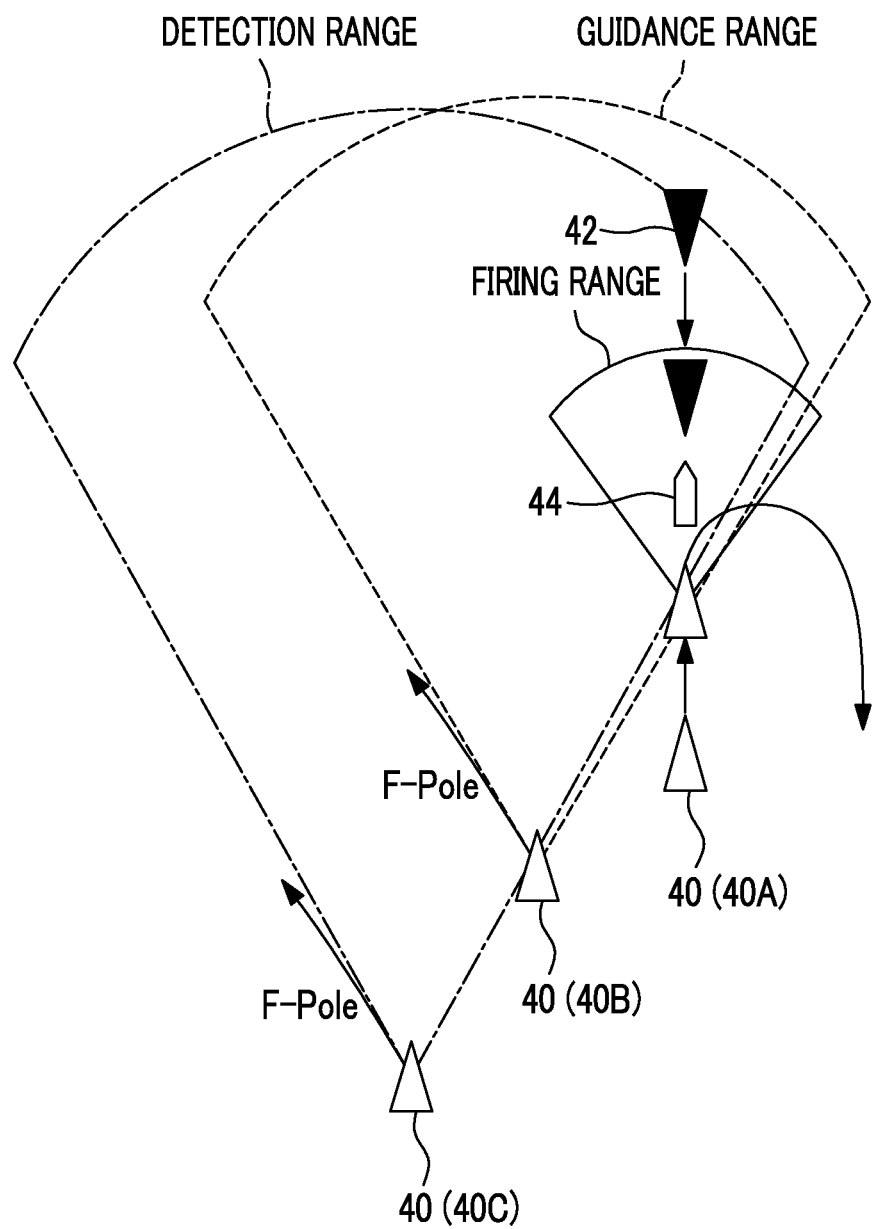
FIG. 2 is a schematic diagram showing a role and a trajectory of an aircraft according to the first embodiment of the present invention.

FIG. 2 is a schematic diagram showing roles and trajectories of the aircraft 40 according to the first embodiment. In addition, in FIG. 2, as an example, only one target aircraft 42 is shown. However, this is an example, and a plurality of target aircraft 42 may be provided. The example of FIG. 2 simulates a Medium Range Missiles (MRM) battle, and the aircraft 40 are so far away from the target aircraft 42 that the target aircraft 42 cannot be viewed from the aircraft 40.

For example, the aircraft 40 can perform projection of a missile 44 with respect to the target aircraft 42, guidance of the missile 44, and detection for and tracking of the target aircraft 42.

That is, for example, the roles of the aircraft 40 are the detection for or tracking of the target aircraft 42, the guidance of the missile 44, and the projection of the missile 44. The guidance of the missile 44 may be guidance of the missile 44 projected by the host aircraft or guidance of missile 44 projected by the accompanying aircraft. For example, in FIG. 2, the role of an aircraft 40A is projection of the missile 44, the role of an aircraft 40B is guidance of the missile 44, and the role of an aircraft 40C is detection for or tracking of the target aircraft 42.

In the example of FIG. 2, an enemy detection range of the aircraft 40, a guidance range of the missile 44, and a firing range of the missile 44 are narrowed in this order.

As shown in FIG. 2, when the aircraft 40 and the target aircraft 42 face each other and fly, a state (a state where noses of the aircraft face with each other, a so-called head-on) where the aircraft 40A opposes the target aircraft 42 is preferable since a firing distance of the missile 44 is the longest, and the aircraft can shoot the missile in a state of being far away from the target aircraft 42. Meanwhile, preferably, the aircraft 40B is positioned to capture the target aircraft 42 and the missile 44 near an end of the guidance range. Preferably, the aircraft 40C is positioned to capture the target aircraft 42 near an end of the enemy detection range. The reason is because the firing range of the target aircraft 42 is narrowed, the speed of the aircraft 40 approaching the target aircraft 42 is slow, and thus, the aircraft 40 can battle against the target aircraft 42 in a state where the aircraft 40 is as far away as possible from the target aircraft 42, and the host aircraft can quickly break away from the firing range of the target aircraft 42 even when the host aircraft approaches the firing range of the target aircraft 42.

Next, a series of roles and a series of trajectories of the aircraft 40 with respect to the target aircraft 42 will be described with reference to FIG. 2.

The aircraft 40C performs the detection for or the tracking of the target aircraft 42, and transmits position information of the target aircraft 42 to the aircraft 40A and 40B. When the target aircraft 42 enters the firing range of the missile 44, the aircraft 40A projects the missile 44 to the target aircraft 42. That is, the target aircraft 42 entering the firing range of the missile 44 of the aircraft 40A indicates the probability of the aircraft 40A entering the firing range of the target aircraft 42. Accordingly, the aircraft 40A falls back with respect to and breaks away from the target aircraft 42 immediately after the aircraft 40A projects the missile 44. As a result, since the aircraft 40A which projects the missile 44 cannot guide the missile 44, the aircraft 40B performs the guidance of the missile 44 which is projected by the aircraft 40A.

In addition, the aircraft 40B has a so-called F-Pole, in which the aircraft 40B avoids the target aircraft 42 while capturing the target aircraft 42 and the missile 44 near an end of the guidance range and guiding the missile 44, as the trajectory. Similarly, the aircraft 40C also has the F-Pole, in which the aircraft 40C avoids the target aircraft 42 while performing enemy detection or tracking near the end of the enemy detection range of the target aircraft 42, as the trajectory.

In this way, the trajectory of the aircraft 40 is determined according to the role of the individual aircraft 40 with respect to the target aircraft 42.

Moreover, the aircraft control device 10 according to the first embodiment, on the basis of relative positional relations between the aircraft 40 and the target aircraft 42, the role of the individual aircraft 40 with respect to the target aircraft 42, and the trajectory of the individual aircraft 40 based on the control operations determined according to the role of the aircraft 40 are determined, by the CPU 12. The relative positional relations between the aircraft 40 and the target aircraft 42 also include an azimuth angle between the aircraft 40 and the target aircraft 42.

In addition, the determined roles and trajectories of the aircraft 40 are transmitted to the corresponding individual aircraft 40 by the transmitting unit 22. When the aircraft 40 receives the roles and trajectories of the host aircraft which are determined by the accompanying aircraft, the roles and trajectories are represented on a cockpit panel. The aircraft 40, in which the roles and the trajectories are determined, represents the roles and trajectories of the host aircraft on a cockpit panel of the host aircraft.

In addition, when a plurality of target aircraft 42 exist, the aircraft control device 10 allocates the aircraft 40 having any role with respect to all the target aircraft 42. In addition, the aircraft control device 10 does not allocate the plurality of aircraft 40 having the same role with respect to the same target aircraft 42. Moreover, when the number of the aircraft 40 is sufficient with respect to the target aircraft 42, the aircraft 40 which does not have any role may exist.

Next, processing (hereinafter, referred to as "role determination processing") of determining the role of the aircraft 40, and processing (hereinafter, referred to as "trajectory determination processing") of determining the trajectory corresponding to the role of the aircraft 40 will be described in detail.

Moreover, as an example, the role determination processing and the trajectory determination processing are performed by the aircraft control device 10 which is included in a command aircraft among the aircraft 40 in a formation. However, the present invention is not limited to this, and for example, the role determination processing and the trajectory determination processing may be also performed by the aircraft 40 which finds the target aircraft 42 initially.

In the aircraft control device 10 according to the first embodiment, the role of the aircraft 40 with respect to the target aircraft 42 is represented by a numerical value, and the role of the aircraft 40 is changed a plurality of times by changing the numerical value. The aircraft control device 10 calculates an evaluation value (hereinafter, referred to as a "role determination evaluation value") which indicates superiority of the aircraft 40 with respect to the target aircraft 42 based on the role of the aircraft 40 every time the role of the aircraft 40 is changed. In addition, the aircraft control device 10 determines the role of the aircraft 40 from the role determination evaluation value.

As an example, the aircraft control device 10 according to the first embodiment calculates a distance (hereinafter, referred to as a "minimum distance to target") at which the aircraft 40 and the target aircraft are closest to each other as the role determination evaluation value, and determines the role of the aircraft 40 having the largest minimum distance to target as the role of the aircraft 40.

As the minimum distance to target is lengthened, the probability of the aircraft 40 being destroyed by the target aircraft 42 is decreased, and thus, stability of the aircraft 40 is increased, and the aircraft 40 has superiority with respect to the target aircraft 42.

Figure 3:
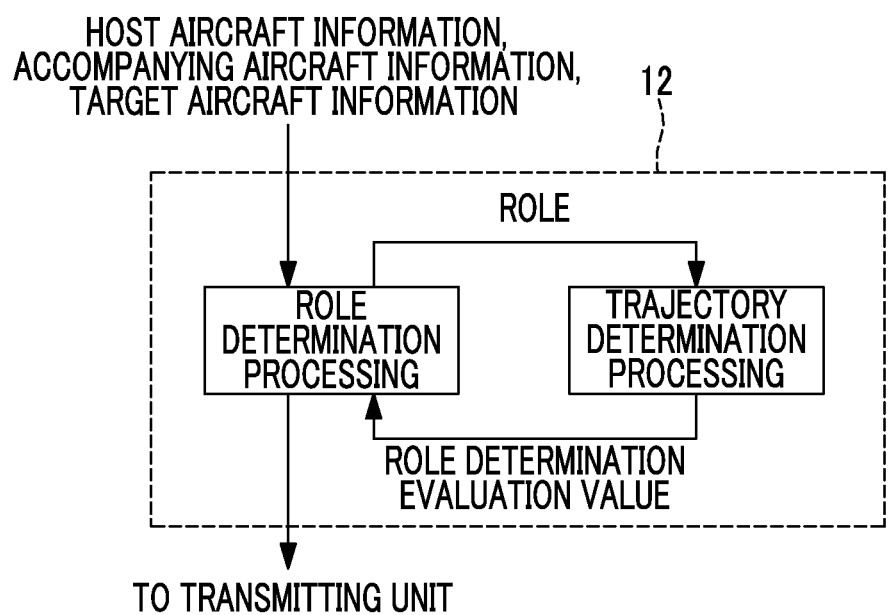
FIG. 3 is a functional block diagram of the aircraft control device according to the first embodiment of the present invention.

FIG. 3 is a functional block diagram of the aircraft control device 10 according to the first embodiment. As shown in FIG. 3, the host aircraft information, the accompanying aircraft information, the target aircraft information, or the like is input to the CPU 12. In addition, if the CPU 12 obtains the role of the aircraft by the role determination processing, the CPU 12 performs the trajectory determination processing based on the obtained role, and obtains the minimum distance to target which is the role determination evaluation value along the trajectory of the aircraft 40. In the role determination processing, after the CPU 12 repeats the change of the role of the aircraft 40 a predetermined number of times, the CPU 12 extracts the role of the aircraft 40 having the largest minimum distance to target which is the role determination evaluation value, and the CPU 12 determines the extracted role of the aircraft 40 as the role of the aircraft 40.

Thereafter, the CPU 12 outputs the information indicating the determined role and trajectory of each aircraft 40 to the transmitting unit 22. The transmitting unit 22 transmits the determined role and trajectory to the corresponding aircraft 40.

In addition, the role of the aircraft 40 is changed by changing the numerical value, and thus, for example, an evolutionary computation method such as genetic algorithms (hereinafter, referred to as "GA") is used. Among advantages of the use of the GA, it is possible to easily generate a plurality of combinations between the aircraft and the roles, differential information of an evaluation function is not required, any solution can be necessarily obtained, and thus, it is possible to easily cope with the increases or decreases in the number of the aircraft 40 and the target aircraft 42.

Figure 4:
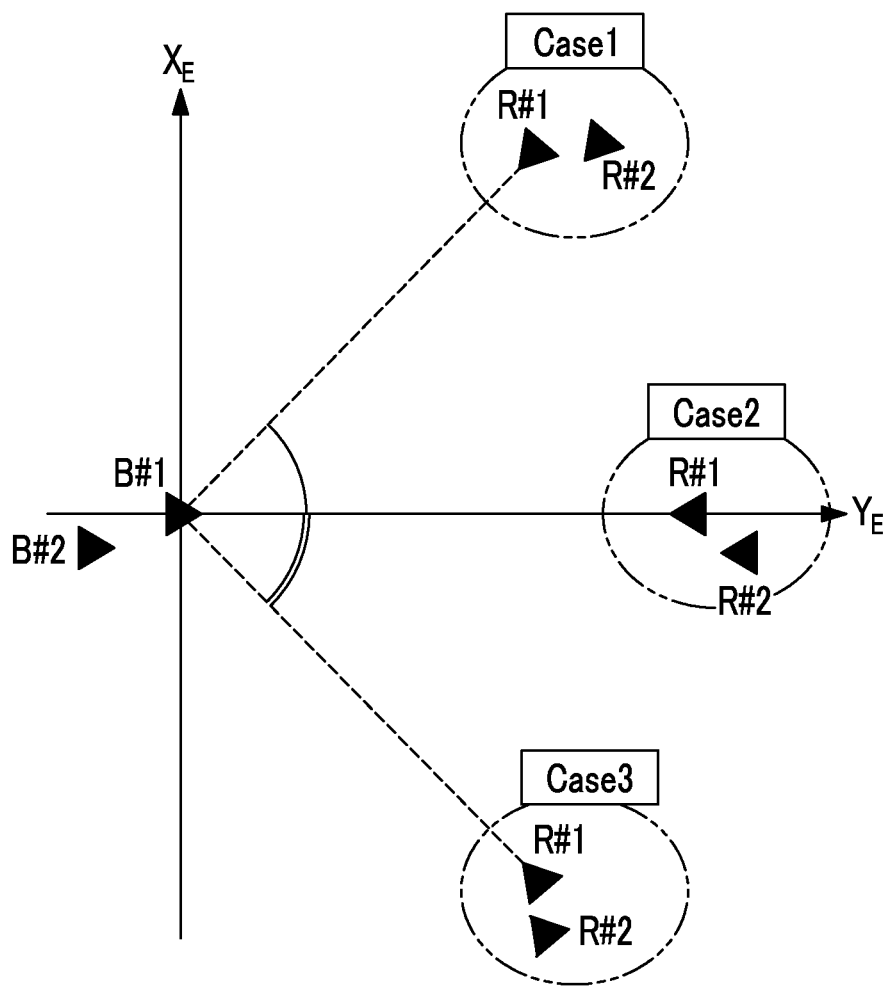
FIG. 4 is a schematic diagram showing relative positional relations between an aircraft and a target aircraft according to the first embodiment of the present invention.

FIG. 4 is a schematic diagram showing relative positional relations between the aircraft 40 (B#1 and B#2) and the target aircraft 42 (R#1 and R#2). As CASE 2, the target aircraft 42 may be positioned at the front surface of the aircraft 40, and as CASE 1 and CASE 3, the target aircraft 42 may be positioned at an angle with respect to the aircraft 40. As an example, in any case, the target aircraft 42 is estimated to have a trajectory approaching the aircraft 40 while maintaining the current behavior, and the role determination and the trajectory determination processing of the aircraft 40 are performed. The estimation of the trajectory in which the current behavior is maintained means that it is estimated that a linear trajectory is maintained with respect to the target aircraft 42 having the linear trajectory, and it is estimated that a turning trajectory is maintained with respect to a turning target aircraft 42. Moreover, in addition to the above-described matters, for example, the estimation of the trajectory with respect to the target aircraft 42 may be performed by simulation based on the performance, the role, or the like of the target aircraft 42. In this way, according to the estimation with respect to the trajectory of the target aircraft 42, it is possible to accurately obtain the role determination evaluation value.

Figure 5:
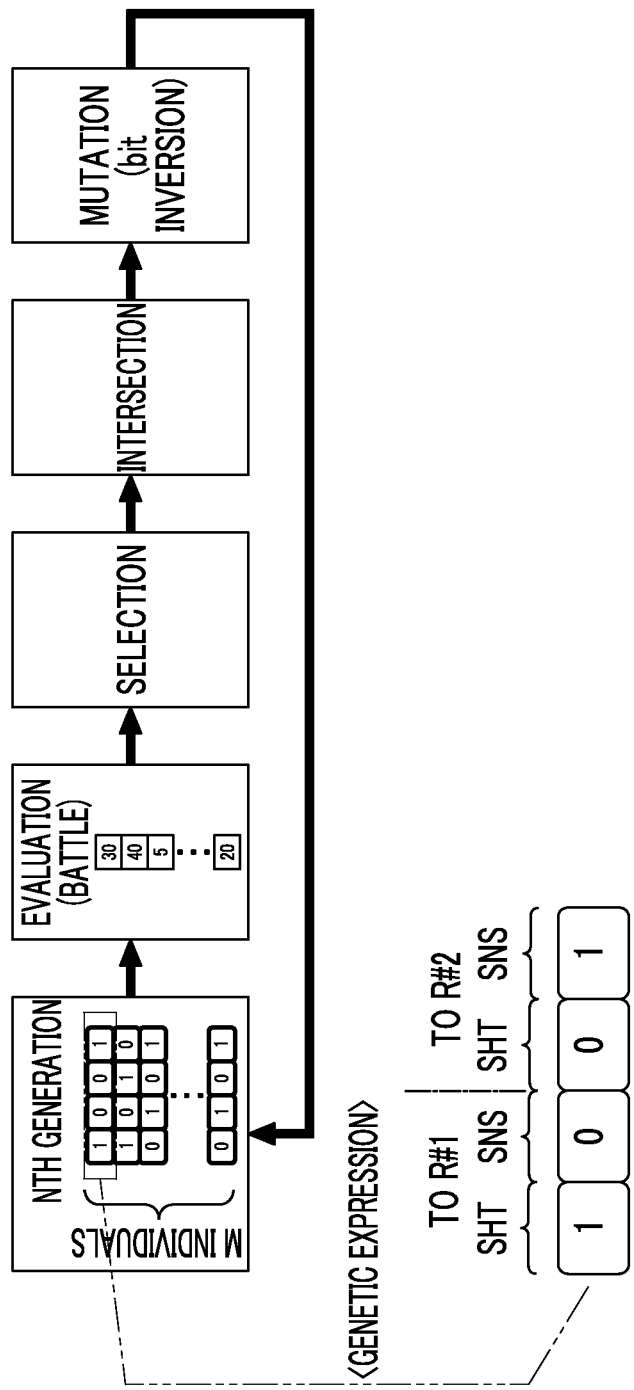
FIG. 5 is a schematic diagram showing a flow of role determination processing which uses GA according to the first embodiment of the present invention.

FIG. 5 is a schematic diagram showing a flow of the role determination processing using the GA.

A genetic expression using the GA will be described. An example of FIG. 5 is a case where the aircraft 40 performs any of the projection (SHT) of the missile 44 with respect to the target aircraft 42 and detection for and tracking (SNS) of the target aircraft 42. In this case, the left end of the genetic expression shows the aircraft 40 which projects the missile 44 to the target aircraft R#1. The second from the left end of the genetic expression shows the aircraft 40 which detects or tracks the target aircraft R#1. The third from the left end of the genetic expression shows the aircraft 40 which projects the missile 44 to the target aircraft R#2. The fourth from the left end of the genetic expression shows the aircraft 40 which detects or tracks the target aircraft R#2. In addition, the numerical values indicate the aircraft 40 which performs each role, "0" indicates the aircraft B#1, and "1" indicates the aircraft B#2.

That is, in the genetic expression shown in the example of FIG. 5, the projection of the missile 44 to the target aircraft R#1 is performed by the aircraft B#2, the detection or tracking with respect to the target aircraft R#1 is performed by the aircraft B#1, the projection of the missile 44 to the target aircraft R#2 is performed by the aircraft B#1, and the detection or tracking with respect to the target aircraft R#2 is performed by the aircraft B#2.

In addition, the numerical values are increased according to an increase in the number of the aircraft 40. Moreover, the genetic expression is added according to the increase in the number of the target aircraft 42. In addition, also in case where the guidance (GUI) of the missile 44 is performed, the corresponding genetic expression is added.

In the individual of the genetic expression, the numeral value is changed, and thus, a plurality of (M) individuals are randomly generated.

Moreover, the trajectory determination processing described in detail below is performed on each individual indicating the role of the aircraft 40, and the minimum distance to target is calculated from the obtained trajectory as the role determination evaluation.

When the minimum distance to target corresponding to each individual is obtained by the trajectory determination processing, the role determination processing generates the individual of the next generation. In order to generate the next generation, in the role determination processing, the individual which performs intersection from M individuals is selected (for example, roulette strategy), and the intersection (for example, two-point intersection) is performed by the selected individuals. In addition, in the role determination processing, mutation (for example, bit inversion) is performed in which the numerical value of the individual selected (for example, stochastically selected) by a predetermined method is changed.

In the trajectory determination processing, the trajectory and the minimum distance to target of the aircraft 40 are obtained for each individual of the next generation generated in this way.

Moreover, in the role determination processing, when the minimum distance to target for each individual of a generation (N generation) determined in advance is obtained, the individual having the longest minimum distance to target is selected from all individuals of all of the next generations, and the role indicated by the selected individual is determined as the role of the aircraft 40. In addition, the trajectory corresponding to the role of the selected aircraft 40 is determined as the trajectory of the aircraft 40.

In addition, the aircraft control device 10 according to the first embodiment may determine the role and trajectory of the aircraft 40 for each predetermined time interval (for example, for each 10 second interval).

Figures 6, 7:
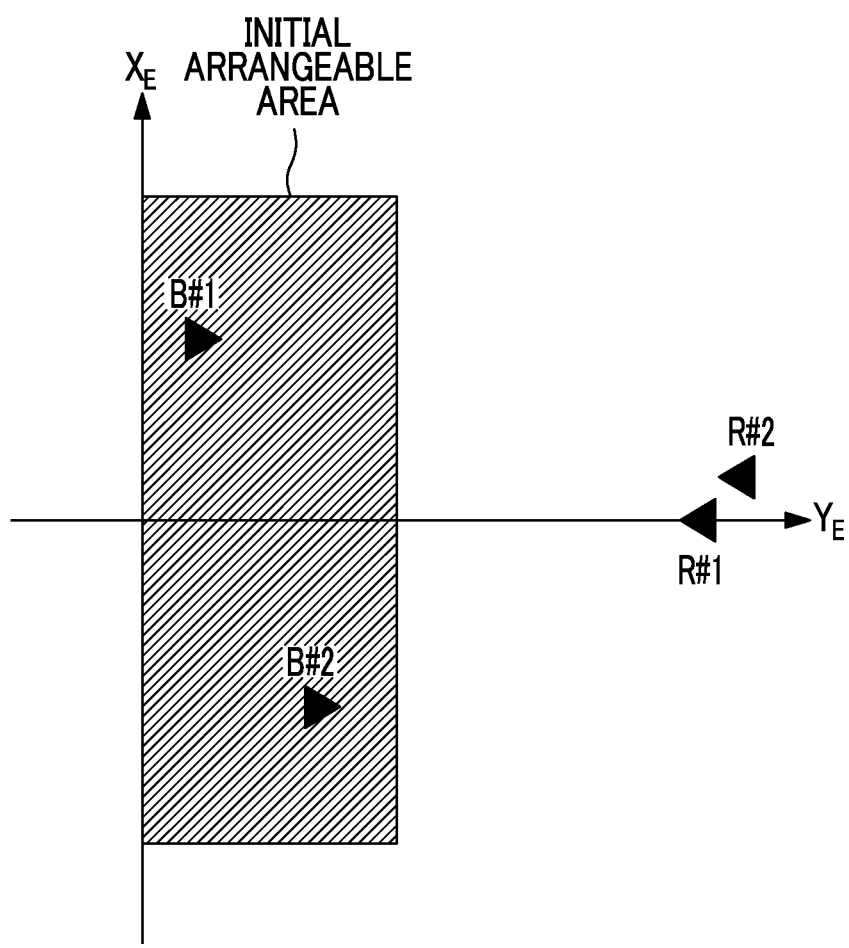
FIG. 6 is a schematic diagram showing a result of periodic processing in role determination processing for each predetermined time interval according to the first embodiment of the present invention.
FIG. 7 is a schematic diagram showing relative positional relations between the aircraft and the target aircraft when an initial disposition position is obtained according to the first embodiment of the present invention.

For example, as shown in FIG. 6, from a time $t_0$ to a time $t_1$, the aircraft B#2 has the role of projecting the missile 44 to the target aircraft #1, and the aircraft B#1 has the role of performing the detection for or the tracking of the target aircraft R#1. In addition, at the time $t_1$, the aircraft B#2 performs the projection of the missile 44 to the target aircraft R#1. Thereafter, from the time $t_2$ to a time $t_3$, the aircraft B#2 has the role of projecting the missile 44 to the target aircraft R#2, and at the time $t_3$, the aircraft B#2 performs the projection of the missile 44 to the target aircraft R#2. Thereafter, in times $t_4$ and $t_5$, the aircraft B#2 detects or tracks the target aircraft R#1.

In addition, the roles and trajectories with respect to the target aircraft 42 from the time $t_0$ to the time $t_5$ are displayed on the cockpit panel of the aircraft B#2 along with times.

Accordingly, a pilot of the aircraft B#2 can easily understand the roles and trajectories to be performed in time series as an arrow indicated by a dashed line in FIG. 6.

In addition, in the role determination processing according to the first embodiment, an initial disposition position of the aircraft 40 may be determined by the GA.

FIG. 7 is a schematic diagram showing relative positional relations between the aircraft 40 and the target aircraft 42 when the initial disposition position is obtained according to the first embodiment. As shown in FIG. 7, a range (hereinafter, referred to as an "initial arrangeable area") is predetermined within which the initial disposition position of the aircraft 40 can be determined, and the initial disposition position of the aircraft 40 within the initial arrangeable area is determined.

The initial arrangeable area is an area in which the aircraft 40 and the target aircraft 42 are farther away from each other than a predetermined distance, and in the initial arrangeable area, a sufficient distance is maintained until the aircraft 40 projects the missile 44 to the target aircraft 42. That is, the initial disposition position of the aircraft 40 is optimized, and thus, it is possible to perform an advantageous attack or the like on the target aircraft 42.

Figure 8:
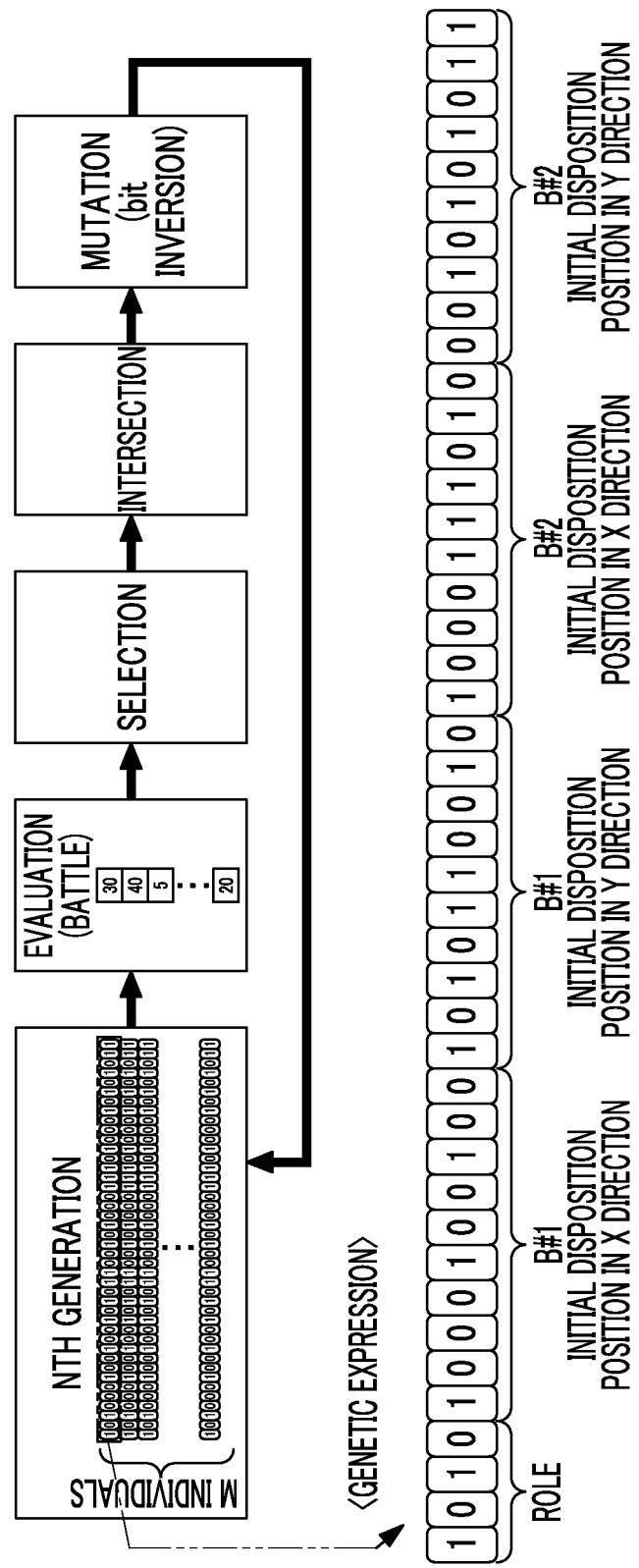
FIG. 8 is a schematic diagram showing a flow of role determination processing using GA when the initial disposition position is obtained according to the first embodiment of the present invention.

FIG. 8 is a schematic diagram showing a flow of the role determination processing using the GA when the initial disposition position is obtained according to the first embodiment.

As shown in FIG. 8, the genetic expression includes the initial disposition position in an X direction and the initial disposition position in a Y direction of the aircraft B#1, and the initial disposition position in the X direction and the initial disposition position in the Y direction of the aircraft B#2.

In the role determination processing, similar to the role of the aircraft 40, the initial disposition position is also changed by performing the intersection and the mutation. In addition, in the trajectory determination processing, the trajectory and the minimum distance to target of the aircraft 40 to which the initial disposition position is added are obtained.

Moreover, the role determination processing and the trajectory determination processing according to the first embodiment are not limited to the case of being performed by a command aircraft, and the GA is distributed and processed to the plurality of aircraft 40, and the results are collected by the command aircraft, and the role of the aircraft 40 may be determined.

Moreover, since the GA has randomness, even when the role determination processing is performed using the same host aircraft information, the same accompanying aircraft information, and the same target aircraft information, the results are not necessarily the same as each other. Accordingly, each aircraft 40 performs the role determination processing and the trajectory determination processing respectively, and as a result, the role of the aircraft 40 having the largest minimum distance to target may be determined as the role of the aircraft 40.

In addition, in the role determination processing according to the first embodiment, the GA is repeated until reaching the predetermined N generation. However, the present invention is not limited to this, that is, the GA may be repeated during a predetermined time, or the GA may be repeated until the amount of the change of the minimum distance to target obtained by the trajectory determination processing is a predetermined value or less.

Moreover, in the role determination processing according to the first embodiment, the number of times of repetition of the GA may be changed according to the distance between the aircraft 40 and the target aircraft 42. For example, when the aircraft 40 is positioned in the initial arrangeable area, in the role determination processing, the GA having more number of times is repeated, and when the aircraft 40 and the target aircraft 42 approach each other from the initial arrange area, the GA having less number of times is repeated.

Next, the trajectory determination processing will be described.

In the trajectory determination processing, the trajectory of the aircraft 40 is determined based on the operation database described by a Plan Goal Graph (PGG) type. In addition, the operation database is stored in the HDD 18 of the aircraft 40. The operation database is prepared in advance based on rules of thumb of the pilot who actually operates the aircraft 40 or the like, and is data which indicates the optimal control operation to be selected according to the situations of the aircraft 40 in order to achieve an object.

Figure 9:
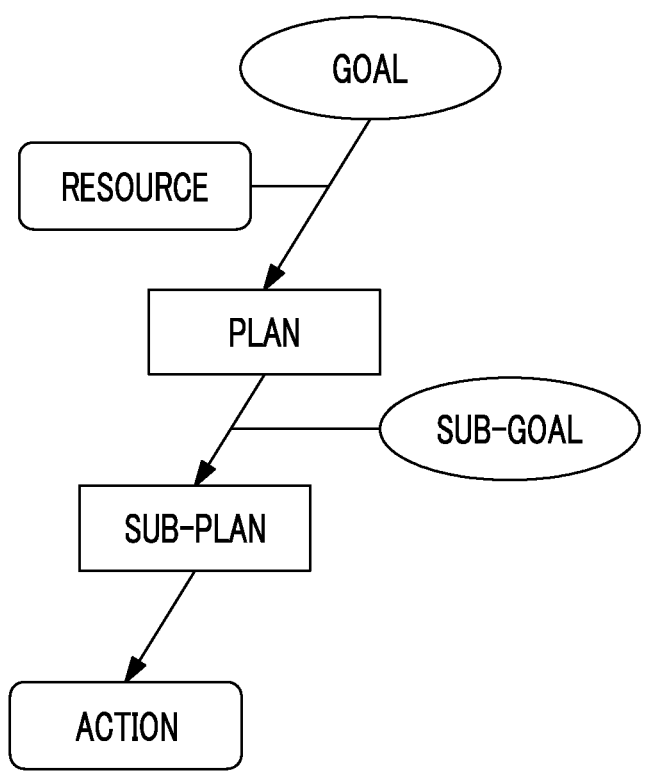
FIG. 9 is a schematic diagram showing content of an operation database described in a PGG type according to the first embodiment of the present invention.

FIG. 9 is a schematic diagram showing content of the operation data described by the PGG type.

The operation database described by the PGG type is mainly configured of a goal which indicates the final object with respect to the target aircraft 42, a plan which indicates the action plan for achieving the goal, and an action which indicates the control operation for performing the plan.

In addition, the operation database determines a sub-goal which is a goal derived from the plan, and a sub-plan indicating an action plan for achieving the determined sub-goal is also included in the component. In order words, the sub-goal is a specific concept of the goal, and is a more specific goal which is derived from the plan.

When the sub-goal is determined, the sub-plan is selected based on a resource (condition), and the action according to the sub-plan is determined. Here, the resource is various pieces of information related to the aircraft 40 which performs the plan, and for example, is the enemy detection range of the aircraft 40, the guidance range, the firing range, kind of the missile 44, equipment content such as a remaining number of bullets, or the like of the missile 44, that is, a combat potential.

Figure 10:
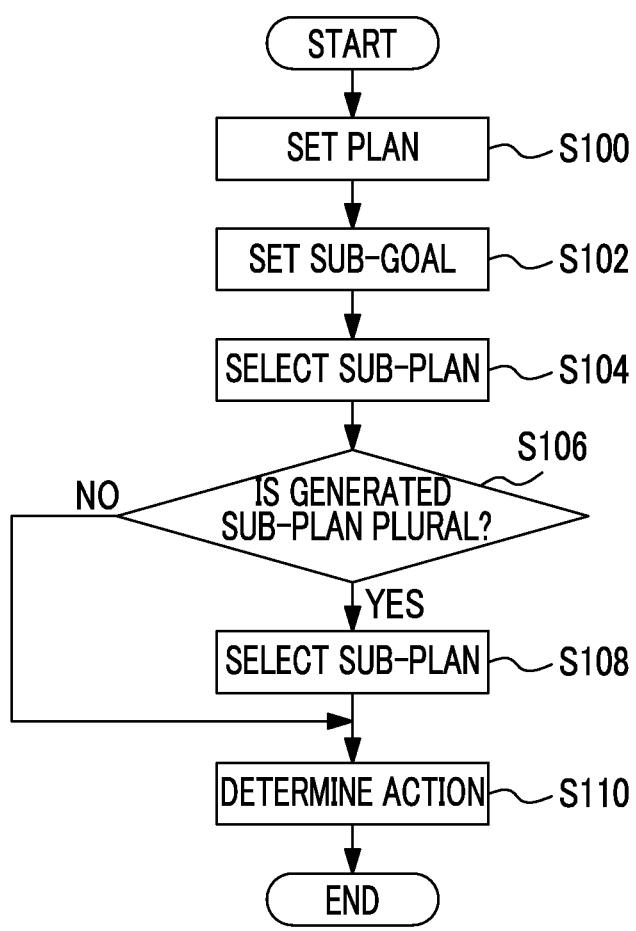
FIG. 10 is a flowchart showing a flow of trajectory determination processing according to the first embodiment of the present invention.

FIG. 10 is a flowchart showing a flow of the trajectory determination processing (air-battle trajectory program) which is carried out by the CPU 12, and the trajectory determination program is stored in a predetermined region of the HDD 18 in advance. In addition, the trajectory determination program is a program for determining the trajectory of the individual aircraft 40, and when the trajectories of the plurality of aircraft 40 are determined, the program is carried out for the individual aircraft 40.

When the trajectory determination processing starts, the role of each aircraft 40 is determined in advance, and relative positional relations between the aircraft 40 and the target aircraft 42, that is, information (hereinafter, referred to as "situational data") such as the position, the speed, and the direction (posture) of each aircraft 40 obtained from the host aircraft information, the accompanying aircraft information, and the position, the speed, and the direction (posture) of each target aircraft 42 is input into the CPU 12.

In addition, for example, the trajectory in which the target aircraft 42 moves straightly with respect to the formation of the aircraft 40 is estimated, and the trajectory determination processing is performed. However, the present invention is not limited to this, and the trajectory of the target aircraft 42 may be estimated using other trajectory estimation methods.

First, in Step 100, the plan is set. That is, the plan is the role of the aircraft 40 which is determined by the role determination processing.

In Step 102, the sub-goal is set.

Figure 11:
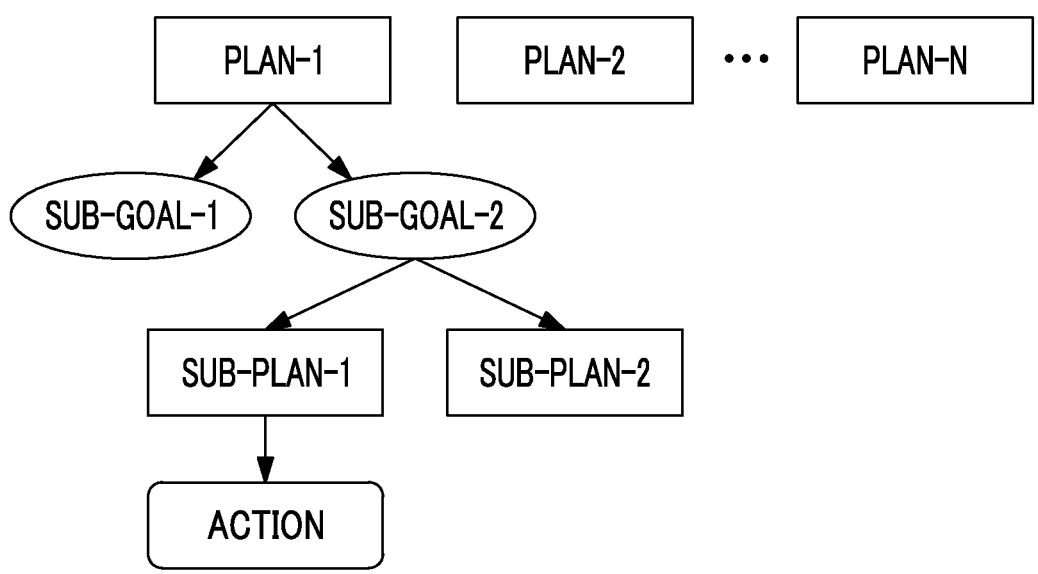
FIG. 11 is a schematic diagram of the operation database according to the first embodiment of the present invention.

As shown in the schematic diagram of the operation database in FIG. 11, since the plurality of sub-goals which can be set according to the plan exist in the operation database, the sub-goal is determined based on the situational data. In addition, an order of priority is attached to the plurality of sub-goals included in the operation database in advance, and the sub-goal having the highest order in the priority is selected based on the situational data.

In the next Step 104, the sub-plan for achieving the sub-goal is selected.

In the next Step 106, it is determined whether or not the selected sub-plan is a plurality of sub-plans, and when the determination result is affirmative, the processing is transferred to Step 108, and when the determination result is negative, the processing is transferred to Step 110 without performing the processing of Step 108.

In Step 108, an evaluation value (hereinafter, referred to as a "sub-plan evaluation value") for each sub-plan is derived, and the sub-plan is selected based on the sub-plan evaluation value. The sub-plan evaluation value may be given as a fixed value for each sub-plan, and may be derived from a function having the situational data of the aircraft 40 used to select each sub-plan as a variable.

The case where the sub-plan evaluation value is derived from the function will be described.

This function is given in advance according to the each sub-plan. Moreover, the situational data of the aircraft 40 which is a variable is a value which is obtained by numerically converting the relative positional relations between the aircraft 40 and the target aircraft 42 using the estimation result of the trajectory, and the state (during the projection preparation, during the guidance, or during an active state) of the missile 44. In addition, the situational data of the aircraft 40 is further subdivided, and for example, the altitude, the speed, the travelling direction, and the posture angle of the aircraft 40, the remaining number of the missiles 44, and the information such as radar information, Radar Warning Receiver (RWR) information, and data link information are numerically converted, and thus, the converted numbers may be variables with respect to the function.

In addition, among the plurality of sub-plan evaluation values, the sub-plan having the highest sub-plan evaluation value is selected.

In Step 110, an action corresponding to the sub-plan is determined. In addition, the action is in association with the sub-plan. Moreover, a position at which the action based on the relative positional relations between the aircraft 40 and the target aircraft 42 is generated is in association with the action.

Figure 12:
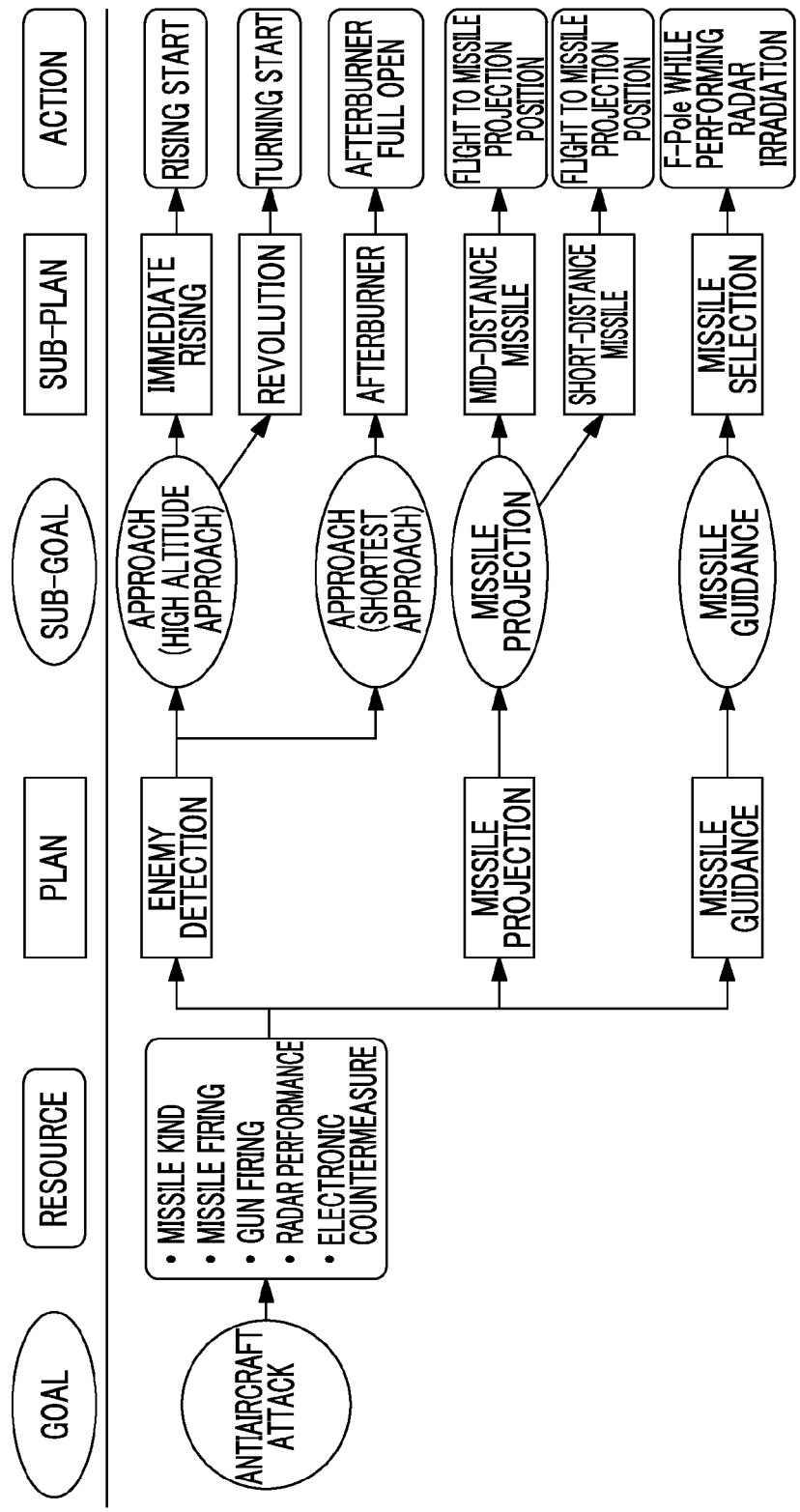
FIG. 12 is a schematic diagram showing a specific example when a goal is set to an antiaircraft attack in the operation database according to the first embodiment of the present invention.

FIG. 12 is a schematic diagram showing a specific example of the operation database, and FIG. 12 is a specific example when the goal is an "antiaircraft attack". For example, flight up to the projection position of the missile 44 which is the action, or flight which performs the F-Pole while performing radar irradiation for guiding the missile 44 is the trajectory of the aircraft 40 which is obtained by the trajectory determination processing.

The minimum distance to target which is the role determination evaluation value is calculated based on the estimation results of the trajectory of the aircraft 40 and the trajectory of the target aircraft 42 obtained in this way. Moreover, the role of the aircraft 40 having the largest minimum distance to target is determined as the role of the aircraft 40, and the trajectory of the aircraft 40 based on the determined role is determined as the trajectory of the aircraft 40.

The role and the trajectory of the aircraft 40 determined by the role determination processing and the trajectory determination processing are respectively transmitted from the aircraft 40 subjected to the role determination processing and the trajectory determination processing to other aircraft 40 in a formation via the transmitting unit 22.

As described above, the aircraft control device 10 determines the role of the individual aircraft 40 with respect to the target aircraft 42 based on the relative positional relations between the aircraft 40 and the target aircraft 42, and the trajectory of the individual aircraft 40 based on the control operations determined according to the role of the aircraft 40.

In addition, the aircraft control device 10 according to the first embodiment represents the role of the aircraft 40 with respect to the target aircraft 42 with the numerical value, changes the role of the aircraft 40 a plurality of times by changing the numerical value, calculates the minimum distance to target every time the role of the aircraft 40 is changed, and determines the role of the aircraft 40 having the largest minimum distance to target as the role of the aircraft 40.

Moreover, in addition to the minimum distance to target, other indexes may be used as the role determination evaluation value. For example, as other indexes, there are the remaining number (hereinafter, referred to as a "remaining number of our side missiles") of the missiles 44 of the aircraft 40 or a ratio (hereinafter, referred to as an "exchange ratio") of a lost number of aircraft between the target aircraft 42 and the aircraft 40.

As the remaining number of our side missiles is increased, the priority of the aircraft 40 with respect to the target aircraft 42 is increased.

For example, the remaining number of our side missiles is obtained through the number of times of the projection of the missiles 44 in the action which is determined by the trajectory determination processing.

If the exchange ratio is more specifically described, for example, a plurality of aircraft 40 and a plurality of target aircraft 42 battle against each other, and the exchange ratio is a ratio of the number between the target aircraft 42 and the aircraft 40 which are lost until the battle ends. As the exchange ratio is increased, the priority of the aircraft 40 with respect to the target aircraft 42 is increased.

The exchange ratio is obtained by simulating the attack of the target aircraft 42 with respect to the aircraft 40 by the trajectory determination processing. Moreover, this simulation may be performed by the known methods of the related art.

In addition, for example, weighted linear sums are calculated with respect to the minimum distance to target, the remaining number of our side missiles, and the exchange ratio, and the calculation results may be the role determination evaluation value.

Second Embodiment

Hereinafter, a second embodiment of the present invention will be described.

In addition, the electrical configuration of the aircraft control device 10 according to the second embodiment is similar to the configuration of the aircraft control device 10 according to the first embodiment shown in FIG. 1, and thus, descriptions thereof are omitted.

FIG. 13 is a functional block diagram of the aircraft control device 10 according to the second embodiment.

The HDD 18 stores a plurality of rules which indicate the roles of the aircraft 40 corresponding to the relative positional relations between the aircraft 40 and the target aircraft 42. As an example, the rules are IF-THEN rules, the relative positional relations between the aircraft 40 and the target aircraft 42 are represented by IF, and the roles of the aircraft 40 corresponding to the relative positional relations are represented by THEN. For example, the IF-THEN rule is generated by the ground equipment or the like in advance, and thereafter, is stored in the HDD 18 of the aircraft 40.

The CPU 12 selects the IF-THEN rule corresponding to the relative positional relations between the target aircraft 42 and the aircraft 40 from the HDD 18 by the role determination processing, and determines the role of the aircraft 40 from the selected IF-THEN rule. Moreover, if the CPU 12 obtains the role of the aircraft 40 by the role determination processing, and the CPU 12 performs the trajectory determination processing based on the obtained role. Thereafter, the CPU 12 outputs the information indicating the determined role and trajectory of the aircraft 40 to the transmitting unit 22. The transmitting unit 22 transmits the role and trajectory to the corresponding aircraft 40. In addition, the trajectory determination processing is similar to that of the first embodiment, and thus, descriptions thereof are omitted.

Next, the details of the IF-THEN rule will be described. In descriptions below, a case where two aircraft B#1 and B#2 which are aircraft 40 battle against target aircraft R#1 and R#2 which are target aircraft 42 will be described.

In addition, in the second embodiment, aircraft Bα and Bβ are used for the names representing the aircraft B#1 and B#2, and target aircraft Rα and Rβ are used for the names representing the target aircraft R#1 and R#2.

The reasons are as follows.

When the IF-THEN rule is defined, proper nouns may be used with respect to the aircraft B#1 and B#2 or the target aircraft R#1 or R#2. However, if the proper nouns are used, for example, the IF-THEN rule is generated with respect to each of two situations in which the aircraft B#1 and the aircraft B#2 are exchanged, and it is necessary to store the two situations in the HDD 18.

Accordingly, in the IF-THEN rule according to the second embodiment, common names which do not specify each of the aircraft 40 and the target aircraft 42, that is, the aircraft Bα and Bβ and the target aircraft Rα and Rβ are used without using proper nouns which specify the aircraft 40 and the target aircraft 42. Accordingly, even at the two situations in which the positional relations of the aircraft B#1 and B#2 are exchanged, it is possible to represent two situations by one IF-THEN rule. Therefore, by using the common names which do not specify the aircraft 40 and the target aircraft 42, it is possible to reduce the number of the IF-THEN rules which are stored in the HDD 18.

Moreover, when the IF-THEN rule is selected, the role of the aircraft 40 is determined by applying the aircraft 40 and the target aircraft 42 to which the proper names are attached with respect to the aircraft 40 and the target aircraft 42 to which the common names are attached.

FIG. 14 is a schematic diagram showing an IF text configuration and a THEN text configuration. In addition, FIG. 14 shows the IF text configuration and the THEN text configuration with respect to the target aircraft Rα. However, the IF text configuration and the THEN text configuration with respect to the target aircraft Rβ are also similar.

The IF text shown in FIG. 14 is configured of the relative positional relations between the aircraft Bα and Bβ and the target aircraft Rα, and a missile status.

The relative positional relations are angles based on the positions of the aircraft 40 and the target aircraft 42, and a distance between the aircraft 40 and the target aircraft 42.

Here, the angles based on the positions of the aircraft 40 and the target aircraft 42 are defined as an Angle Off and an Aspect Angle.

The Angle Off is an angle which is formed between the nose of the aircraft 40 and the nose of the target aircraft 42, and when the aircraft 40 and the target aircraft 42 oppose each other, the Angle Off is 180°, when the aircraft 40 and the target aircraft 42 face in the same direction, the Angle Off is 0°, and the travelling directions of the aircraft 40 and the target aircraft 42 are orthogonal to each other, the Angle off is 90° or 270°.

The Aspect angle is an angle at which the aircraft is positioned with respect to the target aircraft 42 regardless of the directions of noses. The nose direction of the target aircraft 42 is 180°, the tail direction of the target aircraft 42 is 0°, and left and right directions perpendicular to the axis of the target aircraft 42 are 270° and 90°, respectively.

In FIG. 14, the Aspect Angle is indicated by AA and the Angle Off is indicated by AO. In addition, the distance between the aircraft 40 and the target aircraft 42 is indicated by Rng.

Meanwhile, the missile status $MSL_{status}$ represents a relation between the missile 44 and the target aircraft 42 and is an index which indicates whether or not the missile reaches the target aircraft 42, and for example, a value of a surplus distance of the missile 44 is determined.

A surplus distance $R_{ex}$ of the missile 44 is obtained from a speed $V_R$ of the target aircraft 42, a speed $V_{MSL}$ of the missile 44, a residual combustion time $t_f$ of the missile 44, a relative speed $V_{R\text{-}MSL}$ between the missile 44 and the target aircraft 42, and a distance $Rng_{R\text{-}MSL}$ between the missile 44 and the target aircraft 42.

In addition, the speed $V_{MSL}$ of the missile 44 has the travelling direction of the target aircraft 42 as positive.

Accordingly, when the travelling directions of the missile 44 and the target aircraft 42 are the same as each other, $V_{R\text{-}MSL}=V_R-V_{MSL}$ is satisfied. Meanwhile, when the missile 44 and the target aircraft 42 oppose each other, $V_{R\text{-}MSL}=V_R-(-V_{MSL})=V_R+V_{MSL}$ is satisfied.

Moreover, the surplus distance is calculated by the following Expression (1).

$$R_{ex}=V_{R\text{-}MSL} \times t_f - Rng_{R\text{-}MSL} \qquad (1)$$

When the surplus distance $R_{ex}$, which is calculated by the Expression (1), >0 is satisfied, since the missile 44 reaches the target aircraft 42, the missile status $MSL_{status}$ becomes 1. Meanwhile, when the surplus distance $R_{ex} \leq 0$ is satisfied, since the projected missile 44 does not reach the target aircraft 42, the missile status $MSL_{status}$ becomes 0. In addition, also when the missile 44 is not projected, since this means that the missile 44 does not reach the target aircraft 42, the surplus distance $R_{ex} \leq 0$ is satisfied, and the missile status $MSL_{status}$ becomes 0.

In addition, whether or not the missile 44 reaches the target aircraft 42 is not limited to the above-described method. That is, the travelling direction of the target aircraft 42 is estimated, and whether or not the missile 44 reaches the estimated target aircraft 42 may be determined. This determination method is performed by the system which is mounted on the aircraft 40 in advance, and the missile status $MSL_{status}$ is determined based on the information from the system.

In addition, in the THEN text shown in FIG. 14, as an example, the aircraft Bα or the aircraft Bβ which projects (SHT) the missile 44 to the target aircraft Rα is described, and the aircraft Bα or the aircraft Bβ which performs the guidance (GUI) of the missile 44 with respect to the target aircraft Rα is described. Moreover, also when the detection for or the tracking (SNS) of the target aircraft $R_\alpha$ is performed, the aircraft Bα or the aircraft Bβ which performs the SNS is described.

The specific example of the IF-THEN rule is as follows. In addition, the IF-THEN rule described below is an IF-THEN rule when the role of the aircraft 40 with respect to the target aircraft Rα is determined, and the IF-THEN rule when the role of the aircraft 40 with respect to the target aircraft Rβ is determined is similarly described.

IF
AAx≤AA (Bα, Rα)≤AAy & AOx≤AO (Bα, Rα)≤AOy & Rngx≤Rng (Bα, Rα)≤Rngy & AAx≤AA (Bβ, Rα)≤AAy & AOx≤AO (Bβ, Rα)≤AOy & Rngx≤Rng (Bβ, Rα)≤Rngy & $MSL_{status}$ (MSL, Rα)>0

THEN
SHT=Bα
GUI=Bβ

Moreover, as shown in an example of Table 1 below, the IF-THEN rule is represented by an expression in which to 3 bit strings (for example, a gray code of 3 bit strings) are listed.

TABLE 1

| Relation Between Bα and Rα | | | Relation Between Bβ and Rα | | | Relation Between Missile and Rα | Role With Respect To Rα | |
|---|---|---|---|---|---|---|---|---|
| AA | AO | Rng | AA | AO | Rng | $MSL_{status}$ | SHT | GUI |
| 000 | 001 | 011 | 010 | 110 | ### | 1 | 1 | 0 |

In the example of Table 1, for example, when "AA" is "000", the range of the Aspect Angle becomes equal to or more than 0° and less than 45° (AAx=0° and AAy=45°), and when "AA" is "010", the range of the Aspect Angle becomes equal to or more than 135° and less than 180° (AAx=135° and AAy=180°).

In addition, when "AO" is "001", the range of the Angle Off becomes equal to or more than 45° and less than 90° (AOx=45° and AOy=90°), and when "AO" is "110", the range of the Angle Off becomes equal to or more than 180° and less than 225° (AOx=180° and AOy=225').

Moreover, when "Rng" is "011", the range of the distance between the aircraft 40 and the target aircraft 42 becomes equal to or more than 20 NM and less than 30 NM (Rngx=20 NM and RNgy=30 NM).

In this way, the Aspect Angle, the Angle Off, and the range of the distance are determined by 3 bits in advance, and the missile status is represented by 1 bit. In addition, in the role, "0" indicates the aircraft Bα and "1" indicates the aircraft Bβ. Moreover, "###" indicates that an arbitrary value is taken.

Next, generation (optimization) of the IF-THEN rule will be described. As described above, the IF-THEN rule is generated by the ground equipment or the like in advance, and is stored in the HDD 18 of the aircraft 40.

First, the plurality of IF-THEN rules are generated in the ground equipment, and the plurality of IF-THEN rules are continuously used along with the elapsed times before the battle simulation in which the battle between the aircraft 40 and the target aircraft 42 is simulated is stored in the HDD 18 of the aircraft 40. This battle simulation is performed by a battle simulation device 50 (refer to FIG. 16).

In addition, the score corresponding to achievement of a predetermined event in the battle simulation is added to the evaluation value of the IF-THEN rule, and the IF-THEN rule stored in the HDD 18 is determined based on the evaluation value.

In this way, the IF-THEN rule stored in the HDD 18 is determined by the battle simulation which is performed by the battle simulation device 50. For example, since the battle simulation device 50 is provided in the ground equipment, it is possible to determine the rule while applying a sufficient amount of time to the battle simulation.

Moreover, in the IF-THEN rule used in the battle simulation, the evaluation value according to the achievement of the predetermined event by the battle simulation is increased or decreased. The event is the projection, the destroy, or the like of the missile 44 to the target aircraft 42, and the role of the aircraft 40 indicated by the IF-THEN rule by which the event of the projection or destroy of the missile 44 to the target aircraft 42 can be achieved shows an appropriate role of the aircraft 40 corresponding to the situations.

The details of the battle simulation and the calculation method of the scores of the IF-THEN rule will be described in details.

First, in the battle simulation, the initial positions of the simulated aircraft 40 and target aircraft 42 are determined, and the simulated target aircraft 42 is moved with times as set in advance. Meanwhile, the role of the simulated aircraft 40 is determined for each time by the IF-THEN rule based on the relative positional relations between the simulated aircraft 40 and target aircraft 42, and the trajectory of the simulated aircraft is determined by the trajectory determination processing (air-battle trajectory program). For example, as the maximum time of the battle by the battle simulation, minutes are determined in advance. If the maximum times of the battle elapses, even while the aircraft 40 and the target aircraft 42 battle against each other, the battle simulation ends. Even when it does not reach the maximum time of the battle in which the aircraft 40 shoots down all target aircraft 42, the battle simulation ends.

Figure 15:
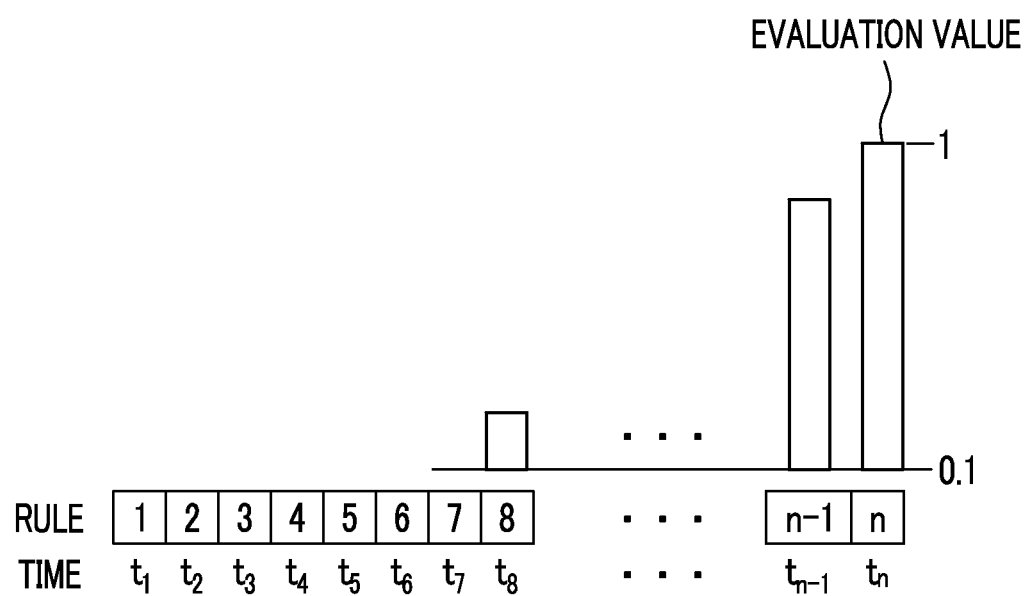
FIG. 15 is a schematic diagram showing history of an IF-THEN rule and distribution of an evaluation value when an event is generated according to the second embodiment of the present invention.

FIG. 15 is a schematic diagram showing history of the IF-THEN rule and distribution of the scores when the event is generated. As shown in FIG. 15, the IF-THEN rule (1 to n) is selected for each time ($t_1$ to $t_n$) with respect to the simulated aircraft 40.

In addition, for example, if the event is achieved by the IF-THEN rule at the time $t_n$, the score corresponding to the event is added to the IF-THEN rule n as the evaluation value.

The details of the event and the score are shown in Table 2 below.

TABLE 2

| Event | Score |
|---|---|
| Missile Has Been Projected | +X |
| Missile Could Not Be Projected (Time Limit Elapse) | −1 |
| Target Aircraft Has Been Destroyed | +Y |
| Target Aircraft Could Not Be Destroyed (Missile Did Not Reach) | 0 |

When the missile 44 has been projected, +X (X<1) is added to the evaluation value of the achieved IF-THEN rule, in a case where the missile 44 could not be projected even if the time limit elapses, −1 is added to the evaluation value of the final IF-THEN rule of the battle simulation. Moreover, when the target aircraft 42 has been destroyed, +Y is added to the evaluation value of the achieved IF-THEN rule, and when the missile 44 did not reach and the target aircraft 42 could not be destroyed, the score is not added to the evaluation value of the IF-THEN rule.

The score (+X) which is added when the missile 44 is projected is not a constant value, and is a value ($L_{BR}/L_{MSL}$) which divides a distance $L_{BR}$ between the aircraft 40 and the target aircraft 42 at the time when the missile 44 is projected by the maximum firing distance $L_{MSL}$ of the missile 44, that is, a value which normalizes the distance $L_{BR}$ by the maximum firing distance $L_{MSL}$.

The score (+Y) which is added when the target aircraft 42 is destroyed is not a constant value, a value $L_{minBR}/L_{MSL}$ which divides the minimum distance to target $L_{minBR}$ from when the missile 44 is projected to when the target aircraft 42 is destroyed by the maximum firing distance $L_{MSL}$ of the missile 44, that is, a value which normalizes the distance $L_{minBR}$ by the maximum firing distance $L_{MSL}$.

In addition, in the IF-THEN rule, an initial value (for example, 0.1) is given as an evaluation value immediately after the IF-THEN rule is generated, and thus, the evaluation value is not smaller than the initial value. In this way, the minimum value is determined in the evaluation value, and the minimum value is always a positive value. Accordingly, since it is not necessary to consider the positive and negative of the evaluation value, it is possible to easily determine whether or not the evaluation value is larger or smaller.

In addition, as shown in FIG. 15, in the IF-THEN rule which is used up to the IF-THEN rule by which the event is achieved, the score which is added to the evaluation value of the IF-THEN rule by which the event is achieved is gradient-distributed. Since not only the IF-THEN rule which is last used but also the IF-THEN which is used up to the final IF-THEN rule are appropriate (or inappropriate), it is considered that the event can be achieved (or cannot be achieved). In this way, in the second embodiment, the score which indicates the contribution degree with respect to the achievement and the non-achievement of the event is gradient-distributed by the IF-THEN rule which is used until the event is achieved or is not achieved, that is, by tracing back to the past, and thus, it is possible to add the more appropriate score to the evaluation value of the IF-THEN rule.

Moreover, the IF-THEN rule is also in association with the number of times of use which is used in the battle simulation.

Figure 16:
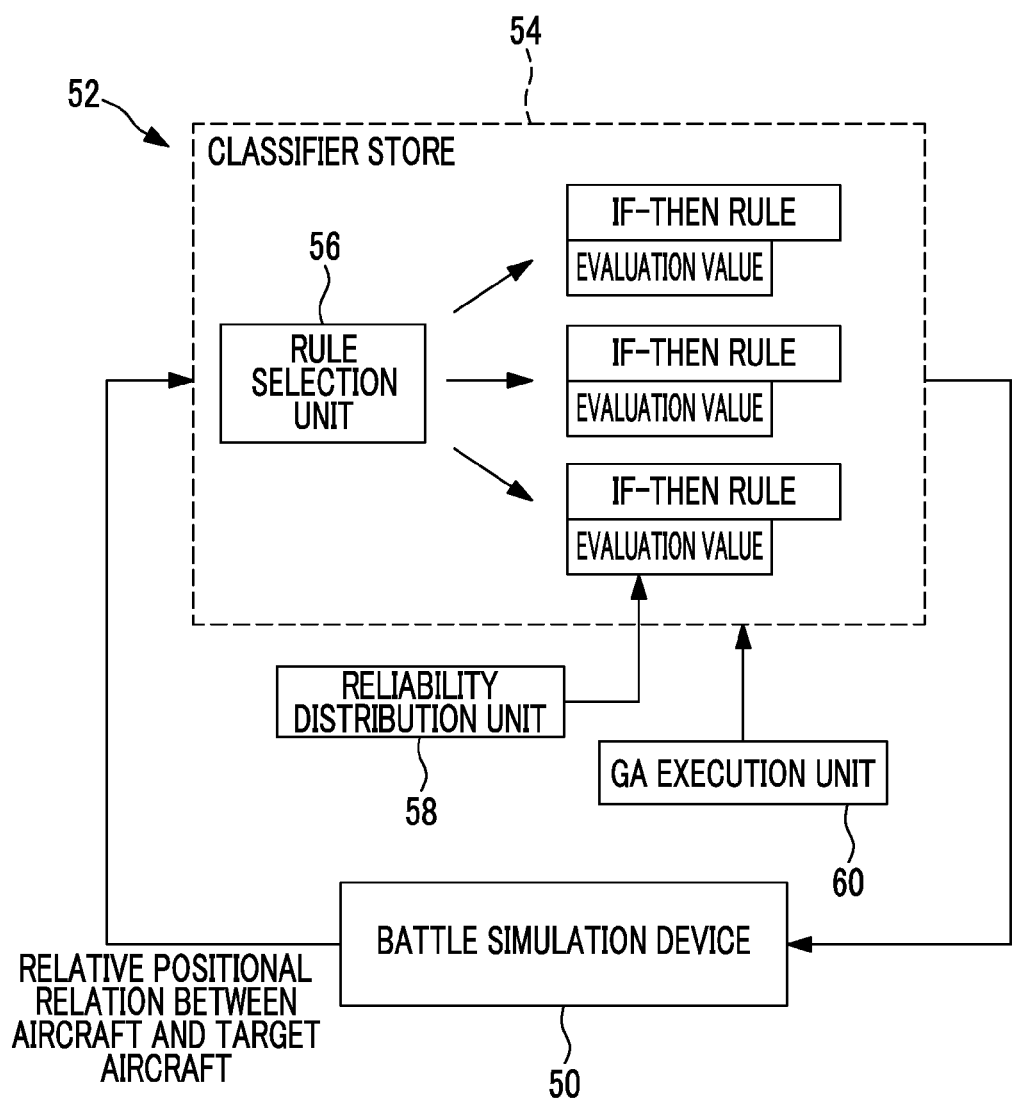
FIG. 16 is a schematic diagram of a classifier system according to the second embodiment of the present invention.

FIG. 16 is a schematic diagram of a classifier system 52 (classifier system) which changes the evaluation value of the IF-THEN rule used on the battle simulation. In addition, in the classifier system 52, the evaluation value corresponds to a concept such as reliability, and the score corresponds to a concept such as compensation.

The classifier system 52 is one of classifier systems referred to as a Michigan Approach. In the second embodiment, the reliability of the IF-THEN rule used in the battle simulation is changed based on the results of the battle simulation which is obtained using the aggregation of the IF-THEN rule, the GA is performed with respect to the IF-THEN rule at a predetermined timing, and thus, a new IF-THEN rule is generated. Moreover, in descriptions below, the IF-THEN rule is also referred to as an individual. That is, one IF-THEN rule is one individual.

First, the classifier system 52 decodes the IF-THEN rule, and a predetermined number is randomly generated as an initial individual aggregation. The generated individual aggregation is stored in a classifier store 54. In addition, since the classifier system 52 generates a new IF-THEN rule using the GA with respect to the generated IF-THEN rule, a counter indicating a generation T satisfies T=1, and a counter indicating the number of times R of execution of the battle simulation satisfies R=1. In addition, the number of times of the use of the IF-THEN rule included in the initial individual aggregation is 0, and the evaluation value becomes the initial value.

Next, the classifier system 52 starts the battle simulation and selects the IF-THEN rule suitable for the relative positional relations between the aircraft 40 and the target aircraft 42 at the time $t_n$ which is the time axis of the battle simulation using a rule selection unit 56, and the selected IF-THEN rule is used in the battle simulation. In addition, when the suitable IF-THEN rule is a plurality of rules, one IF-THEN rule is selected according to probability corresponding to at least one of the evaluation value and the number of times of the use, and the one IF-THEN rule is used in the battle simulation.

That is, as the evaluation value and the number of times of the use of the IF-THEN rule are increased, the probability of being used in the battle simulation is increased.

Moreover, when the suitable IF-THEN rule is not included in the individual aggregation, a new covering is performed, which newly generates the IF-THEN rule suitable for the positional relations between the aircraft 40 and the target aircraft 42 at the time $t_n$ which is the time axis of the battle simulation. In this case, the newly generated IF-THEN rule is added to the individual aggregation.

Moreover, in the newly generated IF-THEN rule, the IF text is described so as to be suitable for the positional relations between the aircraft 40 and the target aircraft 42, the THEN text is randomly described, the number of times of the use becomes 1, and the evaluation value becomes the initial value.

In addition, until the time $t_n$ of the battle simulation reaches the predetermined time $t_N$, the classifier system 52 selects the IF-THEN rule for each time and repeats the battle simulation using the selected IF-THEN rule.

Here, if the event is generated in the battle simulation, the score is added to the evaluation value of the IF-THEN rule by which the event is generated by a reliability distribution unit 58, and the score is gradient-distributed to the IF-THEN rule which is used until the event is achieved.

If the time axis of the battle simulation reaches the time $T_N$, one-time battle simulation ends, and the number of times R of the execution of the battle simulation is increased. In addition, if the battle simulation using the same individual aggregation is performed a predetermined number of times, the GA is performed on the individual aggregation of the IF-THEN rule by the GA execution unit 60. In addition, the reason why the battle simulation is performed the predetermined number of times using the same individual aggregation is because the selected IF-THEN rule may be changed even when the same individual aggregation is used and the results of the battle simulation are not necessarily the same as each other every time.

Moreover, when one-time battle simulation ends, the GA may be performed on the individual aggregation.

The GA using the GA execution unit 60 is performed according to the following Steps.

First, the GA execution unit 60 sorts the IF-THEN rules in order of the number of times of the use, and the IF-THEN rule is divided into a superior predetermined ratio of individual aggregations in which the number of times of the use is higher, and an inferior individual aggregations except for the superior individual aggregations.

Next, the GA execution unit 60 exchanges the IF-THEN rules having evaluation values of a predetermined value or more among the IF-THEN rules in the inferior individual aggregations for the IF-THEN rules having lower evaluation values included in the superior individual aggregations. In addition, the number of the exchanged individuals is set to a ratio which is predetermined with respect to the number of the individuals included in the individual aggregations.

Next, the GA execution unit 60 performs intersection on the IF-THEN rules included in the inferior individual aggregations. The intersected IF-THEN rules are selected by an intersection ratio, and intersection points are randomly determined.

Next, the GA execution unit 60 generates mutation with respect to a predetermined ratio of inferior individual aggregations.

In this way, the GA is performed on the IF-THEN rules. That is, the GA is performed on the predetermined ratio of inferior IF-THEN rules having a low number of times of the use and a low evaluation value while the GA is not performed on the predetermined ratio of superior IF-THEN rules having a high number of times of the use and a high evaluation value, and thus, the IF-THEN rules having a higher number of times of the use and a higher evaluation value remain.

Moreover, in the IF-THEN rule generated by the GA, the evaluation value is the initial value, and the number of times of the use is 0.

If the GA ends, the generation T is incremented, and the next battle simulation using the individual aggregations subjected to the GA is performed. In addition, the battle simulation is repeated until the generation T reaches a predetermined number of times.

As a result, the IF-THEN rules to be stored in the HDD 18 of the aircraft 40 remain. Moreover, the remained IF-THEN rules are stored in the HDD 18 of the aircraft 40. Among the remained IF-THEN rules, in a case where the THEN texts are different from each other even when the IF texts are the same as each other, the IF-THEN rule having a higher evaluation value is stored in the HDD 18.

Moreover, not only the IF-THEN rule is randomly generated but also the IF-THEN rule may be arbitrarily generated in consideration of the actual determination of the pilot of the aircraft 40. Accordingly, assurance of the IF-THEN rule is increased.

As described above, the aircraft control device 10 according to the second embodiment includes the HDD 18 which stores the plurality of IF-THEN rules indicating the roles of the aircraft 40 corresponding to the relative positional relations between the aircraft 40 and the target aircraft 42, selects the IF-THEN rule corresponding to the relative positional relations between the target aircraft 42 and the aircraft 40 from the HDD 18, and determines the role of the aircraft 40 from the selected IF-THEN rule.

Accordingly, the aircraft control device 10 according to the second embodiment can determine a more optimal role for the aircraft 40 at shorter processing times.

Third Embodiment

Hereinafter, a third embodiment of the present invention will be described.

In addition, the electrical configuration of the aircraft control device 10 according to the third embodiment is similar to the configuration of the aircraft control device 10 according to the first embodiment shown in FIG. 1, and thus, descriptions thereof are omitted.

Figure 17:
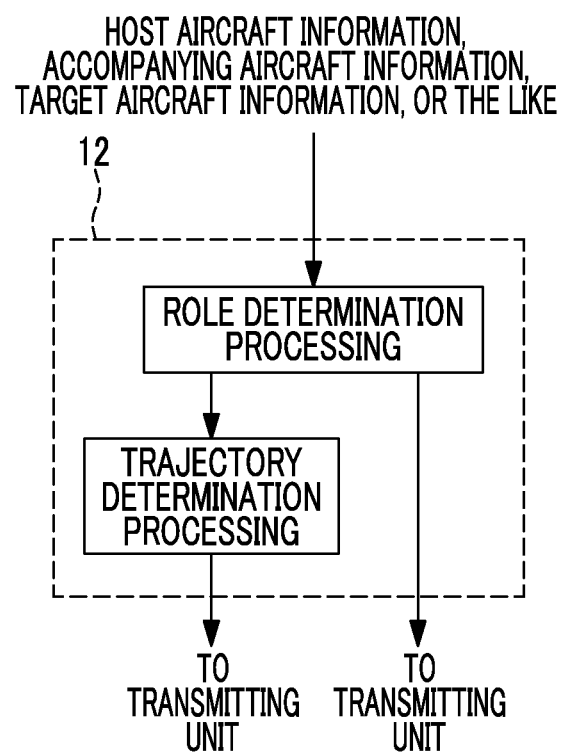
FIG. 17 is a functional block diagram of an aircraft control device according to a third embodiment of the present invention.

FIG. 17 is a functional block diagram of the aircraft control device 10 according to the third embodiment. As shown in FIG. 17, the host aircraft information, the accompanying aircraft information, the target aircraft information, or the like is input to the CPU 12. In addition, after the CPU 12 performs the role determination processing and determines the role of the aircraft 40, the CPU 12 performs the trajectory determination processing based on the determined role and determines the trajectory of the aircraft 40. Thereafter, the CPU 12 outputs the information indicating the determined role and trajectory to the transmitting unit 22. The transmitting unit 22 transmits the determined role and trajectory to the corresponding aircraft 40. In addition, since the trajectory determination processing is similar to that of the first embodiment, descriptions thereof are omitted.

In the role determination processing, the CPU 12 according to the third embodiment determines the role of the aircraft 40 by the evaluation value based on an azimuth angle between the aircraft 40 and the target aircraft 42. Since the direction of the aircraft 40 with respect to the target aircraft 42 is an important element in the projection of the missile 44, the enemy detection, or the tracking, it is possible to determine a more optimal role for the aircraft 40 by the role determination processing according to the third embodiment.

More specifically, in the role determination processing according to the third embodiment, if the aircraft 40 is an aircraft in which the amount of the change of the azimuth angle (hereinafter, referred to as an "azimuth angle change amount") required to oppose the aircraft 40 to the target aircraft 42 is small, a high evaluation value is given to the aircraft 40 as the role of projecting the missile 44. In addition, in the role determination processing, if the aircraft 40 is an aircraft in which the target aircraft 42 and the missile are positioned near the end of the guidance range of the missile 44, a high evaluation value is given to the aircraft 40 as the role of guiding the missile 44. Moreover, if the aircraft 40 is an aircraft in which the target aircraft 42 is positioned near the end of the enemy detection range of the aircraft 40, a high evaluation value is given to the aircraft 40 as the role of detecting or tracking the target aircraft 42.

Table 3 is a SHT evaluation matrix showing an evaluation value (hereinafter, referred to as a "SHT evaluation value") when the aircraft 40 projects the missile 44 to the target aircraft 42.

In Table 3, the SHT evaluation value is $VS_{11}$ when the aircraft B#1 projects the missile 44 to the target aircraft R#1. The SHT evaluation value is $VS_{21}$ when the aircraft B#2 projects the missile 44 to the target aircraft R#1. The SHT evaluation value is $VS_{12}$ when the aircraft B#1 projects the missile 44 to the target aircraft R#2. The SHT evaluation value is $VS_{22}$ when the aircraft B#2 projects the missile 44 to the target aircraft R#2.

TABLE 3

|  | R#1 | R#2 |
| --- | --- | --- |
| B#1 | $V_{S11}$ | $V_{S12}$ |
| B#2 | $V_{S21}$ | $V_{S22}$ |

As the azimuth angle change amount which is required to make the aircraft 40 be a head-on state with respect to the target aircraft 42 is decreased, the aircraft 40 which projects the missile 44 becomes more optimal. The reason is because energy consumed to be the head-on state with respect to the target aircraft 42 is decreased as the azimuth angle change amount is decreased.

Accordingly, in the role determination processing according to the third embodiment, the SHT evaluation value is increased as the Angle Off between the aircraft 40 and the target aircraft 42 approaches 180°. In addition, in the role determination processing according to the third embodiment, the SHT evaluation value is increased as the Aspect Angle approaches 180°, and the SHT evaluation value is increased as the distance between the aircraft 40 and the target aircraft 42 is shortened.

Table 4 is a GUI evaluation matrix showing an evaluation value (hereinafter, referred to a "GUI evaluation value") when the aircraft 40 guides the missile 44 with respect to the target aircraft 42. That is, the GUI evaluation value is $VG_{11}$ when the aircraft B#1 guides the missile 44 to the target aircraft R#1. The GUI evaluation value is $VG_{21}$ when the aircraft B#2 guides the missile 44 to the target aircraft R#1. The GUI evaluation value is $VG_{12}$ when the aircraft B#1 guides the missile 44 to the target aircraft R2. The GUI evaluation value is $VG_{22}$ when the aircraft B#2 guides the missile 44 to the target aircraft R#2.

TABLE 4

|  | R#1 | R#2 |
| --- | --- | --- |
| B#1 | $V_{G11}$ | $V_{G12}$ |
| B#2 | $V_{G21}$ | $V_{G22}$ |

In the role determination processing according to the third embodiment, when the missile 44 is positioned at a straight line which connects the aircraft 40 and the target aircraft 42, the GUI evaluation value is increased as the Angle Off between the aircraft 40 and the target aircraft 42 approaches 0° or 180°. In addition, in the role determination processing according to the third embodiment, when the missile 44 is positioned at the straight line which connects the aircraft 40 and the target aircraft 42, for example, if the guidance range is defined as Z°, the GUI evaluation value is increased as the Aspect Angle approaches Z/2° or 360°−Z/2° (when the Angle Off approaches 0°) or 180°±Z/2° (Angle Off is in the vicinity of 180°), and the GUI evaluation value is increased as the target aircraft 42 is positioned near the end of the guidance range of the missile 44.

Figure 18:
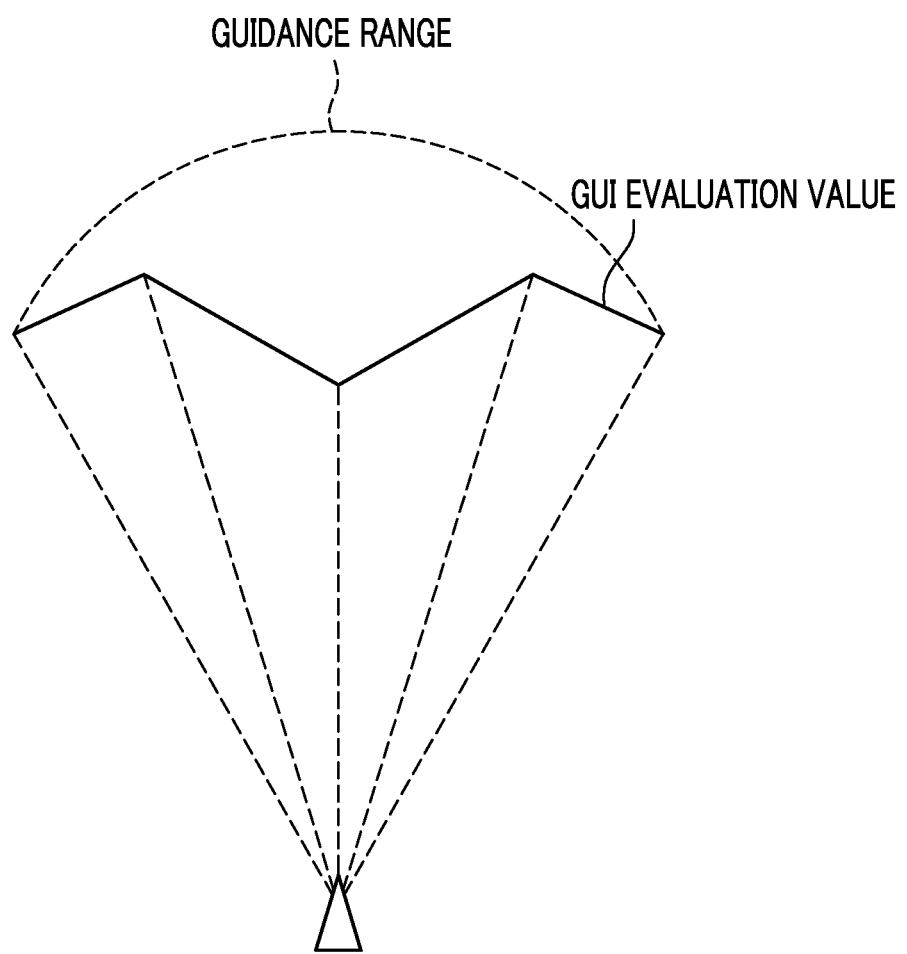
FIG. 18 is a schematic diagram showing a relation between a guidance range and a GUI evaluation value of the aircraft according to the third embodiment of the present invention.

That is, as shown in FIG. 18 which is a schematic diagram showing relations between the guidance range of the aircraft 40 and the GUI evaluation value, the GUI evaluation value is higher in the vicinity of the end of the guidance range than the center of the guidance range. As described above, the reason is because it is preferable that the aircraft 40 which guides the missile 44 captures the target aircraft 42 near the end of the guidance range.

Moreover, in the role determination processing of the third embodiment, a combination in which a total of the calculated SHT evaluation value and GUI evaluation value is largest is selected, and the selected combination is determined as the role of the aircraft 40.

In addition, similar to the GUI evaluation value, the evaluation value when the aircraft 40 which performs the detection for or tracking of the target aircraft 42 is determined is obtained.

Moreover, in the role determination processing according to the third embodiment, the SHT evaluation value and the GUI evaluation value are calculated to be increased as the aircraft 40 is more optimal. However, the present invention is not limited to this, the SHT evaluation value and the GUI evaluation value may be calculated to be decreased as the aircraft 40 is more optimal.

As described above, the aircraft control device 10 according to the third embodiment determines the role of the aircraft 40 by the evaluation value based on the azimuth angle between the aircraft 40 and the target aircraft 42, and thus, the aircraft control device 10 can easily determine the optimal role of the aircraft 40.

Fourth Embodiment

Hereinafter, a fourth embodiment of the present invention will be described.

In the fourth embodiment, generation (optimization) of the IF-THEN rule will be described.

The IF-THEN rule is generated by ground equipment in advance and is stored in the HDD 18 of the aircraft 40. In the above-described second embodiment, the IF-THEN rule is optimized by the ground equipment using the Michigan Approach as the classifier system. However, in the fourth embodiment, the IF-THEN rule is optimized using the Pitts Approach as the classifier system.

In addition, the details of the IF-THEN rule are described in the second embodiment, and thus, descriptions thereof are omitted. In addition, the trajectory determination processing performed in the fourth embodiment is similar to that of the first embodiment, and thus, descriptions thereof are omitted.

Figure 19:
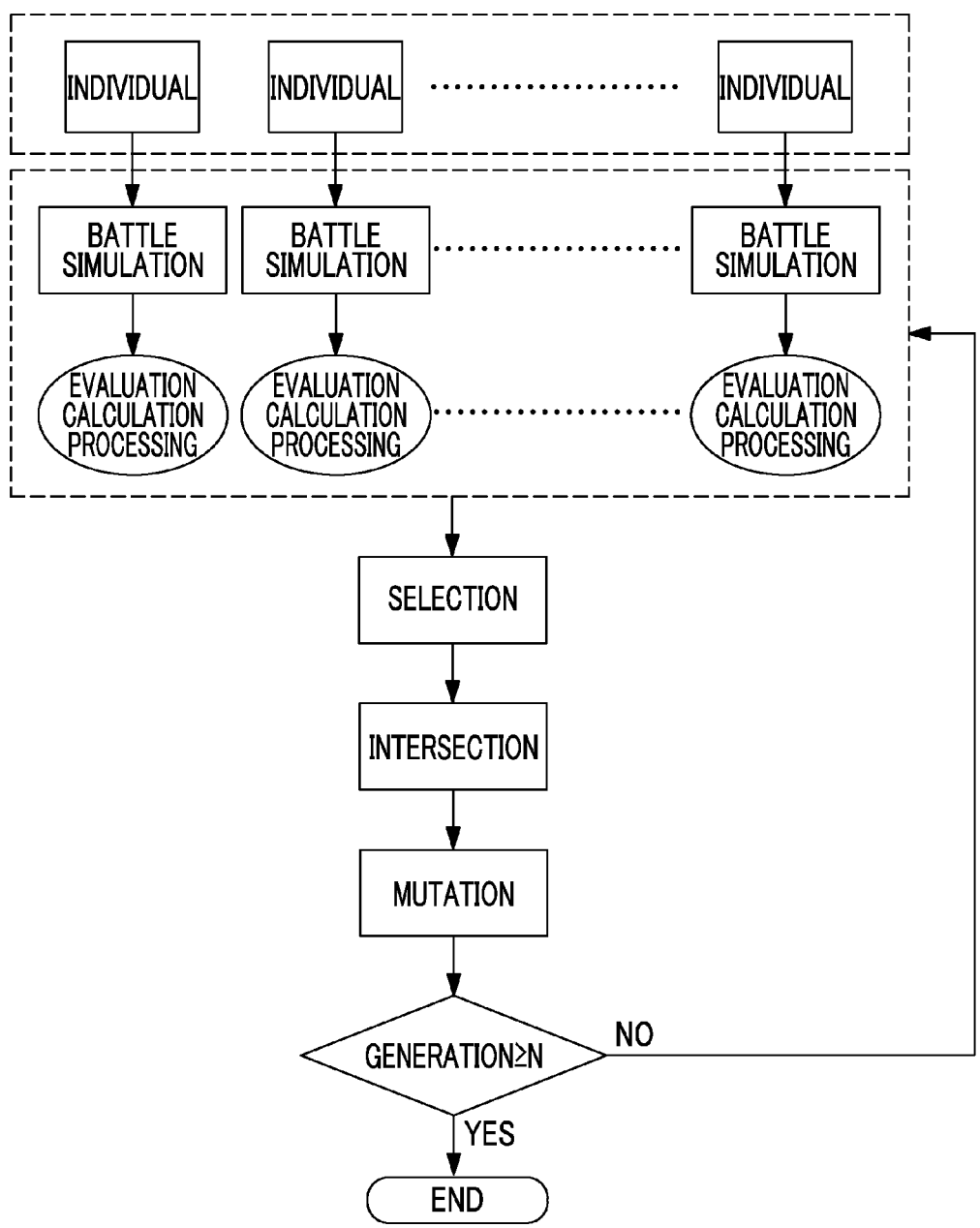
FIG. 19 is a schematic diagram according to optimization of an IF-THEN rule by the Pitts Approach according to a fourth embodiment of the present invention.

As shown in FIG. 19, in the fourth embodiment, aggregations having a predetermined number m (for example, 30) of the IF-THEN rules are defined as one individual by early generation creation processing, and a predetermined number n (for example, n is 30) of individuals are generated as the early generation.

Next, the trajectory of the aircraft 40 is determined for each individual by the battle simulation in which the battle between the aircraft 40 and the target aircraft 42 is simulated using the predetermined number of IF-THEN rules.

In addition, the evaluation value indicating superiority of the aircraft 40 with respect to the target aircraft 42 is determined for each individual by the evaluation value calculation processing.

Thereafter, the IF-THEN rules configuring the individual are changed by the GA, the evaluation value calculation processing is performed every time a new generation is achieved, and when the change of the IF-THEN rule reaches the predetermined N generation (for example, N is 100), the IF-THEN rule stored in the HDD 18 is determined based on the individual having the highest evaluation value.

Hereinafter, the optimization of the IF-THEN rule according to the fourth embodiment will be described in details.

First, in the early generation creating processing, coding is performed on the IF-THEN rule, n×m of IF-THEN rules are randomly generated as the initial IF-THEN rules. Moreover, in the early generation creation processing, the generated IF-THEN rules are divided into m rules, and n individuals become.

Similar to the above-described second embodiment, in the battle simulation which is performed next, the initial position between the simulated aircraft 40 and target aircraft 42 is determined, and the simulated target aircraft 42 is moved with times as set in advance. Meanwhile, the role of the simulated aircraft 40 is determined for each time by the IF-THEN rule based on the relative positional relations between the simulated aircraft 40 and target aircraft 42, and the trajectory of the simulated aircraft 40 is determined by the trajectory determination processing (air-battle trajectory program). For example, as the maximum time of the battle by the battle simulation, 10 minutes are determined in advance. If the maximum times of the battle elapses, even while the aircraft 40 and the target aircraft 42 battle against each other, the battle simulation ends. Even when it does not reach the maximum time of the battle in which the aircraft shoots down all target aircraft 42, the battle simulation ends.

Figure 20:
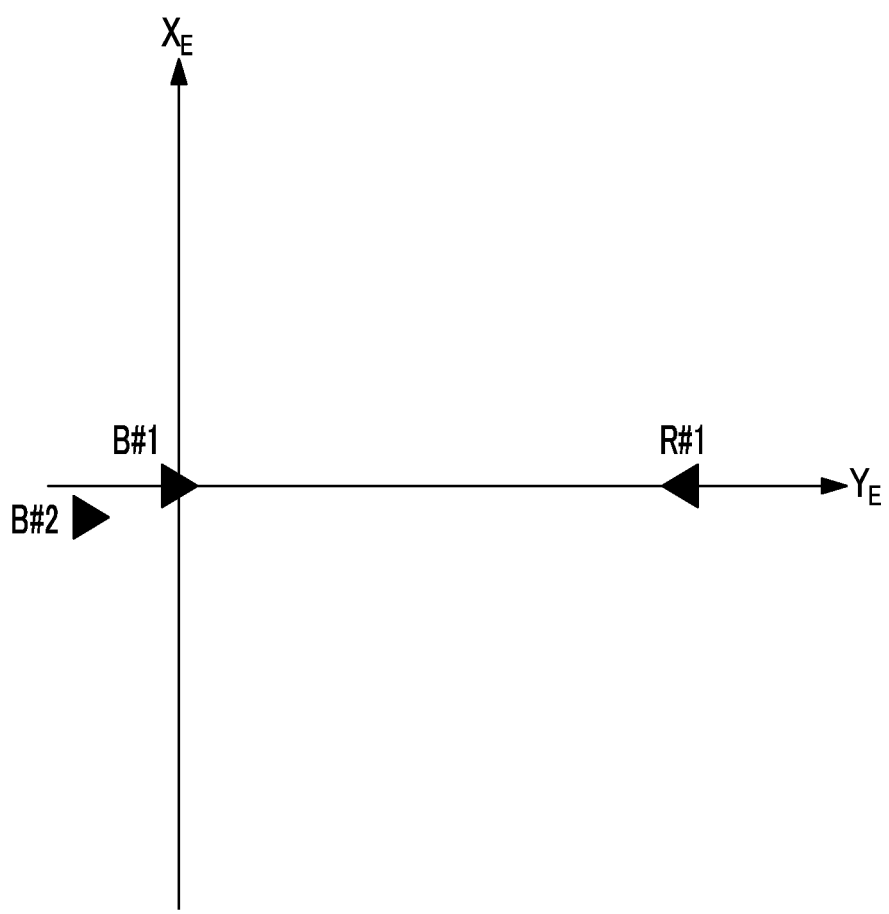
FIG. 20 is a diagram showing a positional relation between an aircraft and a target aircraft which are simulated according to battle simulation of a fourth embodiment of the present invention.

FIG. 20 is a diagram showing an example of the positional relations between the simulated aircraft 40 and target aircraft 42 in the battle simulation.

In the example of FIG. 20, the number of the aircraft 40 is two (B#1 and B#2), and the number of the target aircraft 42 is one (R#1). In addition, a distance interval and a flight altitude which are determined in advance are given as the initial positions. In addition, at least any role of the detection or the tracking (SNS) with respect to the target aircraft 42, the projection (SHT) of the missile 44, or the guidance (GUI) of the missile 44 is given to the aircraft 40 from the IF-THEN rule. The aircraft 40 to which any role is given is allocated to all target aircraft 42.

Moreover, on the basis of the air-battle trajectory program, the battle between the aircraft 40 and the target aircraft 42 is simulated while the trajectory of the aircraft 40 is determined.

In this case, role sharing of the aircraft 40 may be changed according to the IF-THEN rule.

In addition, the IF-THEN rules configuring the individual are eliminated and added based on the battle simulation.

Specifically, in the battle simulation, when the IF-THEN rule suitable for the positional relations between the aircraft 40 and the target aircraft 42 does not exist in the individual, covering which newly generates the IF-THEN rule is performed. In this case, the newly generated IF-THEN rule is added to the individual.

Moreover, when the overlapping (same) IF-THEN rules exist in the individuals, one is randomly selected from the overlapping IF-THEN rules, and the selected IF-THEN rule is used. Meanwhile, the IF-THEN rule which is not selected is eliminated from the individual.

Moreover, after the battle simulation ends, only the used IF-THEN rule remains, and the IF-THEN rule which is not used is eliminated from the individual.

In this way, by performing the addition and elimination of the IF-THEN rules, the length of the individuals becomes variable. However, reproductivity of the evaluation value calculation processing is secured while corresponding to the deficiency or the overlapping of the IF-THEN rule.

Next, the details of the evaluation value calculation processing will be described.

The evaluation value is determined based on the minimum distance to target in the battle simulation. In addition, considering the projection situations of missile from the aircraft 40, the number of destroyed target aircraft 42, the remaining number of the missile 44 mounted on the aircraft 40, or the like, weighting may be performed on the evaluation value.

The following Expression (1) is an example of a calculation expression which calculates the evaluation value. In addition, since dimensions of items included in Expression (1) are different from one another, items may be appropriately divided by a value for normalizing the items.

$$\begin{aligned}\text{Evalulation Value} = \quad & \text{[Expression 1]} \\ W_1 \times & \text{Minimum Distance To Target During Battle} + \\ W_2 \times & \text{Distance To Target When Missile Is Projected} - \\ & \text{Missle Distance to Target Distance When Missile} \\ & \text{Is Projected Number of Projected Missile} + \\ W_3 \times & \text{Destroy Evalulation Value} + \\ W_4 \times & \text{Remaining Bullet Number Evaluation Value} + \\ W_5 \times & \text{Battle Maximum Time} - \\ & \text{Battle Time Battle Maximum Time} \end{aligned}$$

The first item is the minimum distance to target in the battle simulation. As the minimum distance to target is increased, since the aircraft 40 can battle against the target aircraft 42 so as to be away from the target aircraft 42, the superiority of the aircraft 40 with respect to the target aircraft 42 is increased.

The second item evaluates the distance in which the projected missile 44 approaches the target aircraft 42. The distance to target of the missile is a distance when the missile 44 is closest to the target aircraft 42, and when the missile 44 abuts the target aircraft 42, the distance to target of the missile becomes 0 (zero), and the value of the second item is further increased. That is, the second item shows that the superiority of the aircraft 40 with respect to the target aircraft 42 is increased as the distance to target of the missile is decreased.

The third item is an evaluation value which is given according to the number of the target aircraft 42 destroyed by the aircraft 40.

The fourth item is an evaluation value which is given according to the remaining number of the missiles 44 which are mounted on the aircraft 40.

Figure 21:
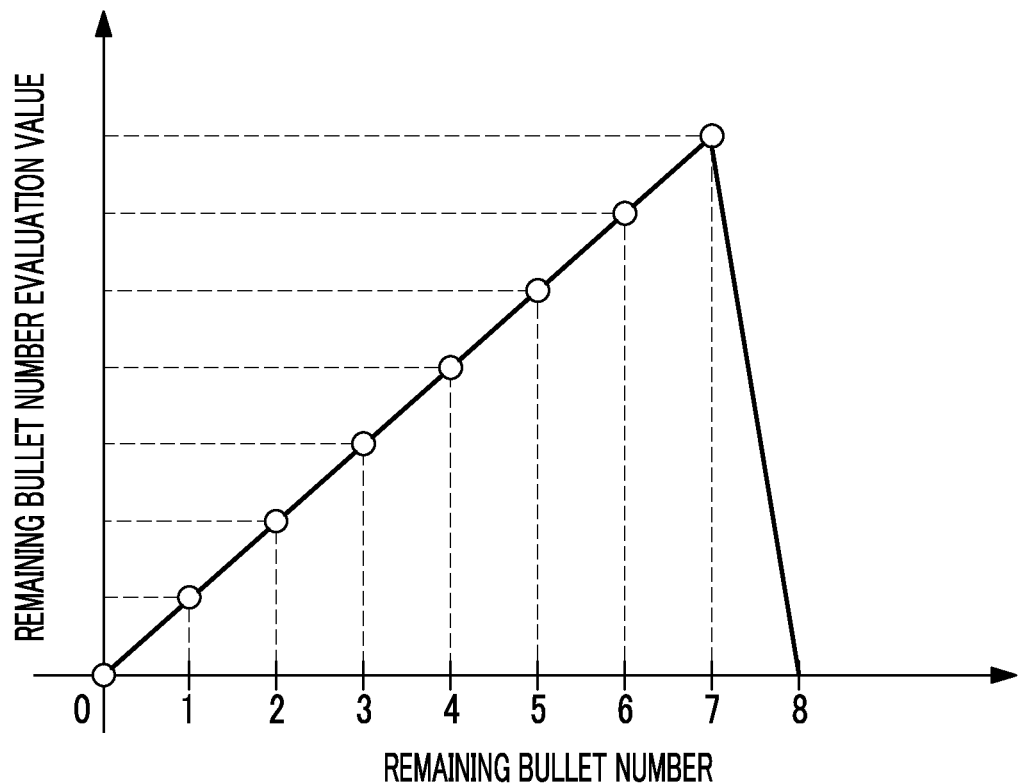
FIG. 21 is a diagram showing an example of methods for calculating a remaining bullet number evaluation value according to the fourth embodiment of the present invention.

FIG. 21 is a diagram showing an example of methods for calculating the remaining bullet number evaluation value.

The horizontal axis indicates the remaining number of the missiles 44 mounted on the aircraft 44. In the aircraft 40, as an example, four missiles 44 are mounted on one aircraft 40. Accordingly, in the example of FIG. 20, since the aircraft 40 are two, the total number of the missiles 44 mounted on the aircraft 40 is eight. The vertical axis indicates the remaining bullet number evaluation value.

Moreover, when the remaining bullet number is eight, since it is not a situation capable of projecting the missile 44 to the target aircraft 42, the remaining bullet number evaluation value is lowest. In addition, when the remaining bullet number is seven, since the target aircraft 42 has been destroyed by one missile 44, the remaining bullet number evaluation value is highest. As the remaining bullet number is decreased from seven, the remaining bullet number evaluation value is decreased. This is because the superiority of the aircraft 40 with respect to the target aircraft 42 is decreased as the remaining bullet number is decreased.

The fifth item is a time which is required until the battle simulation ends. If the aircraft 40 shoots down all the target aircraft 42 at a shorter battle time than the predetermined maximum times of the battle, the times of the fifth item are further increased.

In addition, the evaluation value shown in Expression (1) is not limited to the fourth embodiment, and may be also used in other embodiments. Moreover, one item or a plurality of items among the first item to the fifth item configuring Expression (1) are combined, and the combination may be used for other embodiments.

As described above, if the evaluation value is calculated with respect to each individual, the change of the IF-THEN rule is performed by the GA, and a new generation of individual is generated.

Moreover, in the evaluation value calculation processing, the individual having the highest evaluation value compared to other individuals is not an object of the GA, and also remains in the next generation as it is.

In the GA for generating the next generation, the individuals which perform the intersection from n individuals are selected (for example, roulette strategy), and the intersection (for example, two-point intersection) is performed between two individuals among the selected individuals. In addition, the GA changes the value which is selected (for example, stochastically selected) by a predetermined method with respect to the IF-THEN rule configuring the individual, and performs mutation. M individuals, which become the new generation by the selection, the intersection, and the mutation, are subjected to the battle simulation and the evaluation value calculation processing again.

In addition, if it reaches the predetermined N generation, the GA for making the new generation is not performed, and the individual having the highest evaluation value is determined as the IF-THEN rule stored in the HDD 18.

Next, the details of the intersection performed by the GA will be described.

In the GA according to the fourth embodiment, a random number (hereinafter, an "intersection random number") is generated with respect to the combination of two individuals among the selected individuals, and when the intersection random number is the predetermined intersection ratio or less, two individuals are intersected to each other. In addition, as an example, the intersection random number is 0 to 1, and the intersection ratio is 0.8.

Here, as described above, the individual according to the fourth embodiment increases and decreases the number (hereinafter, referred to as a "configuration rule number") of the IF-THEN rules configuring the individual.

Figure 22:
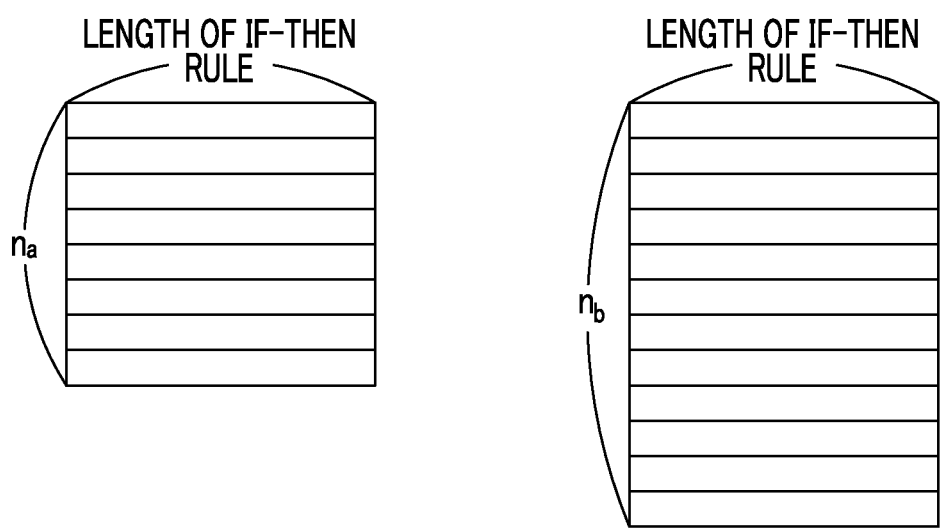
FIG. 22 is a schematic diagram of intersected individuals according to the fourth embodiment of the present invention.

FIG. 22 is a schematic diagram of the individuals which are intersected according to the fourth embodiment. The vertical direction indicates the configuration rule numbers $n_a$ and $n_b$. In addition, in the example of FIG. 22, $n_a<n_b$ is satisfied. The horizontal direction indicates the length of the IF-THEN rule. In addition, as shown in Table 1 of the second embodiment, as an example, the IF-THEN rule is configured of 21 bits, and the length is not changed.

In addition, the intersection is performed based on the individual having a small configuration rule number. Accordingly, even when the intersection is performed between two individuals in which the configuration rule numbers of the individuals are different from each other, the intersection is certainly performed. If the intersection is performed based on the individual having a large configuration rule number, the object to be intersected may not exist in the individual having a small configuration rule number.

In the fourth embodiment, when the intersection is performed, in order to determine the range, two numerical values (hereinafter, referred to as a "RND value") are randomly generated in the vertical direction and the horizontal direction. In addition, the value of the IF-THEN rule included in the range of the generated RND value is intersected.

Figure 23A:
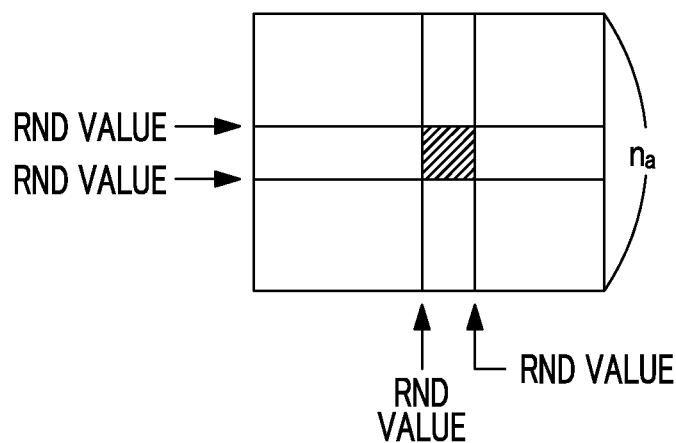
FIG. 23 is a schematic diagram showing an intersection pattern according to the fourth embodiment of the present invention.

Specifically, when the intersection random number is a predetermined value (for example, 0.4) or less, as shown in FIG. 23(a), in the range surrounded by the RND values, a range becoming an AND condition (a range which is hatched in the FIG. 23(a)) is intersected. In contrast, when the intersection random number exceeds the predetermined value, as shown in FIG. 23(b), in the range surrounded by the RND values, a range becoming an OR condition (a range which is hatched in FIG. 23(b)) is intersected.

In addition, the RND values having the same value are not generated. This reason is because the range surrounded by the RND values cannot be determined.

Figure 23B:
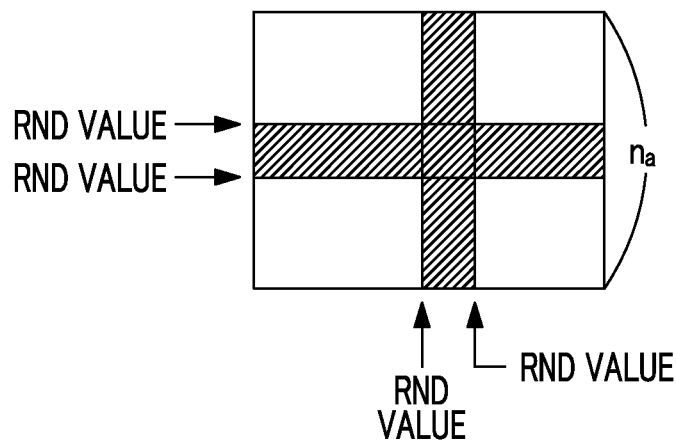

In descriptions below, the intersection method shown in FIG. 23(a) is referred to as an intersection pattern 1, and the intersection method shown in FIG. 23(b) is referred to as an intersection pattern 2.

In two individuals which are intersected, the RND value is newly generated with respect to the vertical direction of the individual having a larger configuration rule number. The intersection pattern having the generated RND value as the reference position is applied to the individual having a larger configuration number, and the intersection is performed between two individuals within a range which is determined by the intersection pattern.

Figure 24A:
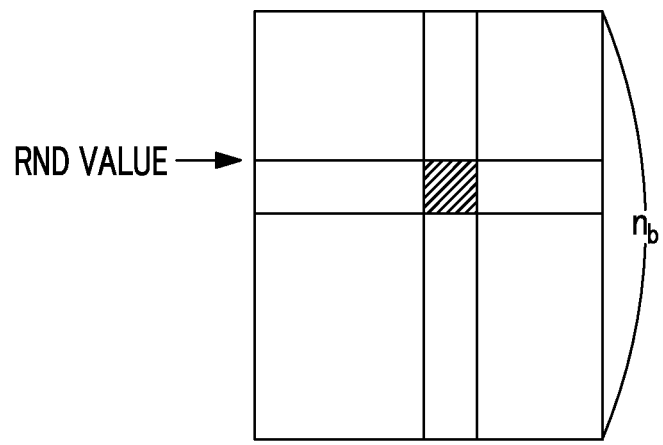
FIG. 24 is a schematic diagram of the individuals in which the number of configuration rules, to which the intersection pattern according to the fourth embodiment of the present invention is applied, is many.

FIG. 24(a) is a schematic diagram of the individual having a larger configuration rule number to which the intersection pattern 1 is applied.

Figure 24B:
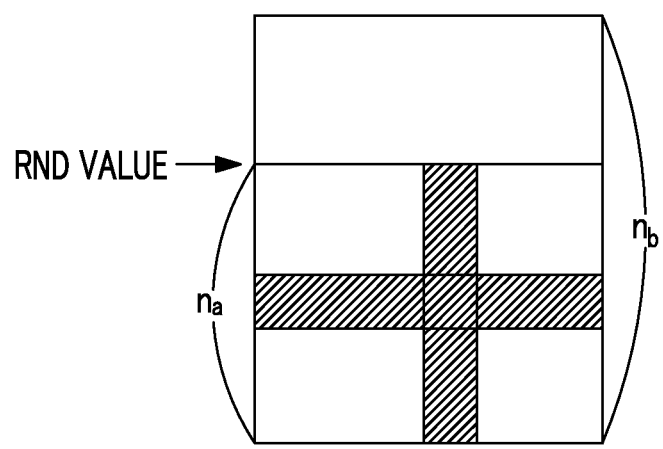

FIG. 24(b) is a schematic diagram of the individual having a larger configuration rule number to which the intersection pattern 2 is applied. In addition, in the intersection pattern 2, the RND value is selected so that all individuals having a smaller configuration rule number is included in the individual having a larger configuration rule number.

Next, the details of the mutation which is performed by the GA will be described.

The GA according to the fourth embodiment generates random numbers (hereinafter, referred to as "mutation random numbers") corresponding to every positions (hereinafter, referred to as "gene locus") of all values of all IF-THEN rules configuring the individuals. In addition, when the mutation random number is a predetermined mutation ratio or less, the GA generates the mutation. In addition, as an example, the mutation random number is 0 to 1, and the mutation ratio is 0.3.

Specifically, the gene locus which causes the mutation is positioned at the position corresponding to the IF text, and a value of "#" is randomly changed to "0" or "1". In addition, the value of "#" makes sense by 3 bits including the front and the rear, the front and the rear are collected and also changed.

In addition, the gene locus which causes the mutation is positioned at the IF text, and the value of "0" is changed to "1". When the mutation random number is a predetermined value or less, the value may be changed to "#".

Moreover, the gene locus which causes the mutation is positioned at the IF text, and the value of "1" is changed to "0". When the mutation random number is a predetermined value or less, the value may be changed to "#".

In addition, when "0" or "1" is changed to "#" and the sense is made by 3 bits including the front and the rear, the front and the rear are collected and changed to "#".

Moreover, when the gene locus which causes mutation is positioned at the position corresponding to the THEN text, the value of "0" is changed to "1", and the value of "1" is changed to "0".

As described above, according to the fourth embodiment, the aggregation of the IF-THEN rules is set to one individual, the predetermined number of individuals are generated as an early generation, and the evaluation value is calculated for each individual based on the trajectory of the aircraft 40 which is determined by the battle simulation in which the battle between the aircraft 40 and the target aircraft 42 is simulated using the IF-THEN rule. In addition, the evaluation value is calculated every time the IF-THEN rule configuring the individual is changed and set to a new generation, and when the change of the IF-THEN rule reaches the predetermined generation, the IF-THEN rule stored in the HDD 18 is determined based on the individual having the highest evaluation value. Accordingly, the appropriate IF-THEN rule for determining the role of the aircraft 40 is stored in the HDD 18 of the aircraft 40.

Fifth Embodiment

Hereinafter, a fifth embodiment of the present invention will be described.

In addition, the electrical configuration of the aircraft control device 10 according to the fifth embodiment is similar to the configuration of the aircraft control device 10 according to the first embodiment shown in FIG. 1, and thus, descriptions thereof are omitted.

In the CPU 12 according to the fifth embodiment, the battle simulation in which the battle between the aircraft and the target aircraft 42 is simulated is performed every time the roles of the aircraft 40 with respect to the target aircraft 42 are combined. Moreover, the CPU 12 determines the role of the aircraft 40 and the trajectory of the aircraft 40 based on the evaluation value which indicates the superiority of the aircraft 40 with respect to the target aircraft 42 obtained from the result of the battle simulation. In descriptions below, the processing is referred to as role sharing verification processing.

FIG. 25 is a schematic diagram showing a situation in which the role sharing verification processing is performed. As an example, in FIG. 25, two (B#1 and B#2) or four (B#1 to B#4) aircraft 40 are configured in a formation. Meanwhile, four (R#1 to R#4) or eight (R#1 to R#8) target aircraft 42 are configured in a formation.

Figure 26:
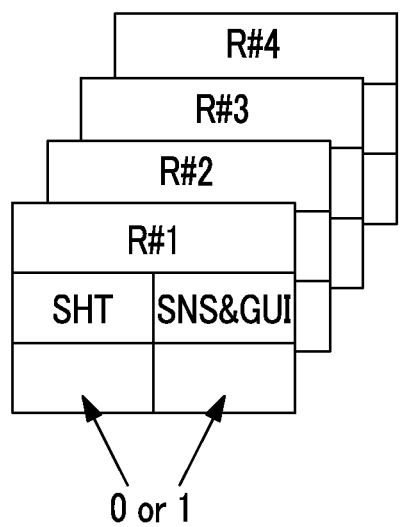
FIG. 26 is a schematic diagram showing combinations of roles of aircraft with respect to all target aircraft according to the fifth embodiment of the present invention.

As shown in FIG. 26, the CPU 12 according to the fifth embodiment generates the combinations of the roles of the aircraft 40 with respect to all the target aircraft 42.

The example of FIG. 26 shows a case where two (B#1 and B#2) aircraft 40 and four (R#1 to R#4) target aircraft 42 are provided, and any one role of the projecting (SHT) of the missile 44, the detection for or the tracking of the target aircraft 42, and the guidance (SNS & GUI) of the missile 44 to the target aircraft 42 is given to the aircraft 40. That is, indicating B#1 or "1" indicating B#2 is applied to the SHT and SNS & GUI of FIG. 26.

In addition, in the example of FIG. 26, combinations in the role sharing such as $(2\times2)^4=256$ are generated.

In addition, for example, when four (B#1 to B#4) aircraft 40 and eight (R#1 to R#8) target aircraft 42 are provided, combinations in the role sharing such as $(4\times4)^8=4294967296$. Moreover, if the role of the SNS & GUI of the aircraft 40 is divided into two roles of the detection for or the tracking (SNS) of the target aircraft 42 and the guidance (GUI) of the missile 44, combinations in the role sharing such as $(4\times4\times4)^8=2814\times10^{14}$ are generated.

In the role sharing verification processing according to the fifth embodiment, the battle simulation is performed on the combinations in all role sharing.

In the battle simulation, the initial positions of the simulated aircraft 40 and the target aircraft 42 are determined based on the accompanying aircraft information, the host aircraft information, and the target aircraft information, and the simulated target aircraft 42 is moved as set in advance with times. Meanwhile, the role of the simulated aircraft 40 is determined based on the combination of the role sharing, and the trajectory of the simulated aircraft 40 is determined by the trajectory determination processing (air-battle trajectory program).

Moreover, the calculation method of the evaluation value in the role sharing verification processing is similar to the calculation of the evaluation value in the above-described fourth embodiment.

In addition, the CPU 12 displays the combination of the role sharing having the highest evaluation value on the cockpit panel. When the pilot of the aircraft 40 does not accept the displayed role sharing, the CPU 12 displays the combination of the role sharing having the second highest evaluation value on the cockpit panel, and this is repeated until the pilot accepts the role sharing.

Moreover, as an example, the role sharing verification processing is performed by the aircraft control device 10 which is included in the command aircraft among the aircraft 40 in a formation. In addition, the role sharing accepted by the pilot of the command aircraft is transmitted to other aircraft 40.

Moreover, the battle simulation in the combinations in all the role sharing may not be within a predetermined termination time. For example, as described above, such as four aircraft 40 or eight target aircraft 42, the number of the aircraft 40 or the target aircraft 42 may be increased. In this case, the CPU 12 causes only a predetermined number of aircraft 40 to correspond with respect to a predetermined number of target aircraft 42 corresponding to the threat level, and thus, the combinations in the role sharing become to have a small size.

Whether or not the battle simulation ends within the termination time is determined based on the number of the aircraft 40 and the target aircraft 42. For example, moreover, the threat level of the target aircraft 42 is determined by the distance to target, the formation shape of the target aircraft 42, the mounted armaments of the target aircraft 42, the azimuth angle of the target aircraft 42, or the like. The mounted armament of the target aircraft 42 is determined by the ground equipment, an Airborne Warning And Control System (AWACS), or the like.

According to this processing, the load required for the role sharing verification processing is decreased, and as a result, the time required for the role sharing verification processing is shortened.

Specifically, for example, the threat level is increased as the distance to target is shortened by the CPU 12, and the target aircraft 42 are sorted. In the example of FIG. 25, the target aircraft 42 are sorted in the following order, that is, R#1, R#2, R#3, R#4, ... and R#8.

Moreover, the CPU 12 performs the role sharing verification processing to correspond with the B#1 and B#2 which are the aircraft 40 positioned at the front of the target aircraft 42 of R#1 and R#2, and B#3 and B#4 which are the aircraft 40 positioned at the rear side of the target aircraft 42 of R#3 and R#4.

Figure 27:
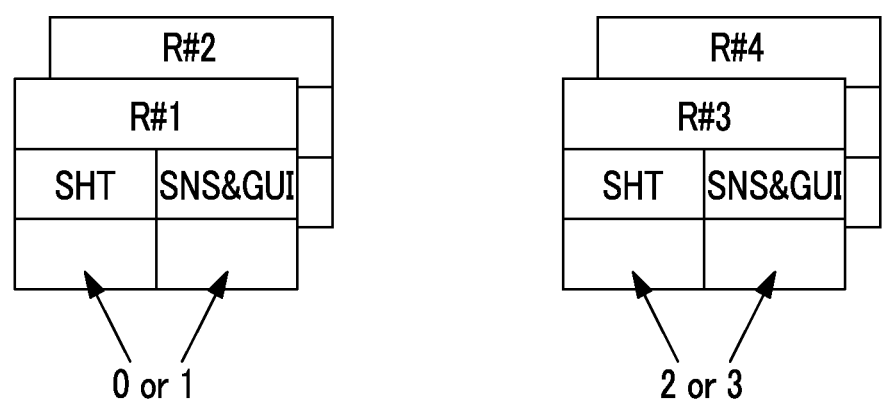
FIG. 27 is a schematic diagram showing combinations of the roles of the aircraft with respect to the target aircraft according to the fifth embodiment of the present invention.

Accordingly, as shown in FIG. 27, "0" indicating the B#1 or "1" indicating B#2 is applied to the SHT and SNS & GUI with respect to the target aircraft 42 of R#1 and R#2. In addition, "2" indicating the B#3 or "3" indicating B#4 is applied to the SHT and SNS & GUI with respect to the target aircraft 42 of R#3 and R#4.

As a result, the combinations in the role sharing such as $(2\times2)^2=16$ are generated with respect to the target aircraft 42 of R#1 and R#2 and the target aircraft 42 of R#3 and R#4, respectively. Moreover, even when the role of SNS & GUI of the aircraft 40 is divided into two roles of the detection for or the tracking (SNS) of the target aircraft 42 and the guidance (GUI) of the missile 44, the combinations in the role sharing become $(2\times2\times2)^2=64$, and thus, the combinations in the role sharing are significantly decreased.

Moreover, the role sharing verification processing with respect to the target aircraft 42 of R*5 to R#8 is separately performed after the role sharing verification processing with respect to the target aircraft 42 of R#1 to R#4 ends.

As described above, the aircraft control device 10 according to the fifth embodiment performs the battle simulation in which the battle between the aircraft 40 and the target aircraft 42 is simulated is performed every time the roles of the aircraft 40 with respect to the target aircraft 42 are combined. In addition, in the aircraft control device 10, the role of the aircraft 40 and the trajectory of the aircraft 40 are determined based on the evaluation value indicating the superiority of the aircraft 40 with respect to the target aircraft 42 obtained from the results of the battle simulation. Accordingly, the aircraft control device 10 can determine a more optimal role for the aircraft 40.

Sixth Embodiment

Hereinafter, a sixth embodiment of the present invention will be described.

In addition, the electric configuration of the aircraft control device 10 according to the sixth embodiment is similar to the configuration of the aircraft control device 10 according to the first embodiment shown in FIG. 1, and thus, descriptions thereof are omitted.

The aircraft control device 10 according to the sixth embodiment performs first resource management processing in which the role determination processing and the trajectory determination processing according to the above-described first embodiment are combined, second resource management processing in which the role determination processing and the trajectory determination processing according to the above-described second embodiment are combined, and third resource management processing in which the role determination processing and the trajectory determination processing according to the above-described third embodiment are combined. In addition, the aircraft control device 10 determines one of the roles and trajectories of the aircraft 40 obtained by the first resource management processing, the second resource management processing, and the third resource management processing as the role and trajectory of the aircraft 40.

Figure 28:
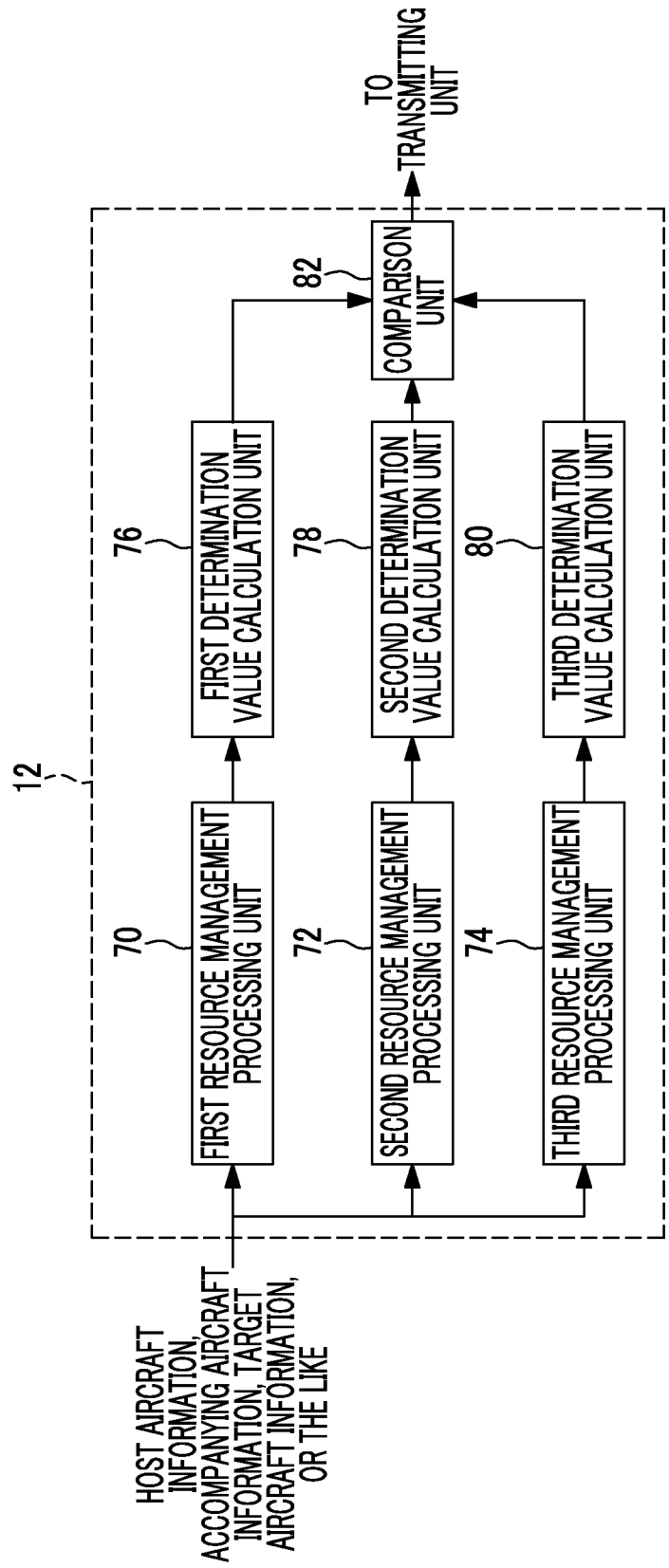
FIG. 28 is a functional block diagram of an aircraft control device according to a sixth embodiment of the present invention.

FIG. 28 is a functional block diagram of the aircraft control device 10 according to the sixth embodiment. As shown in FIG. 28, the CPU 12 includes a first resource management processing unit 70 which performs the first resource management processing, a second resource management processing unit 72 which performs the second resource management processing, and a third resource management processing unit 74 which performs the third resource management processing.

In addition, the CPU 12 includes a first determination value calculation unit 76, a second determination value calculation unit 78, a third determination value calculation unit 80, and a comparison unit 82.

The first determination value calculation unit 76 calculates a predetermined determination value from the roles and trajectories of the aircraft 40 which are obtained by the first resource management processing.

The second determination value calculation unit 78 calculates a predetermined determination value from the roles and trajectories of the aircraft 40 which are obtained by the second resource management processing.

The third determination value calculation unit 80 calculates a predetermined determination value from the roles and trajectories of the aircraft 40 which are obtained by the third resource management processing.

In addition, for example, the determination value is the minimum distance to target, the remaining number of the missiles 44, or the like.

The comparison unit 82 compares the determination values calculated by the first determination value calculation unit 76, the second determination value calculation unit 78, and the third determination value calculation unit 80, and outputs the role and trajectory of the most preferable aircraft 40.

Moreover, when the minimum distance to target is used as the determination value, the comparison unit 82 outputs the role and the trajectory of the aircraft 40 having the longest minimum distance to target. In addition, when the remaining number of the missiles 44 is used as the determination value, the comparison unit 82 outputs the role and trajectory of the aircraft 40 having the largest remaining number of the missiles 44. In addition, when weighted linear sums with respect to the minimum distance to target and the remaining number of the missiles 44 are used as the determination values, the comparison unit outputs the role and trajectory of the aircraft 40 having the largest weighted linear sum.

In addition, the first resource management processing, the second resource management processing, and the third resource management processing are respectively performed by the aircraft 40 which are different from each other, the determined roles and trajectories of the aircraft 40 and the determination values are transmitted to a predetermined aircraft 40, and the aircraft 40 may compare the determination values.

In addition, a fourth determination value processing unit is further provided. The fourth determination value processing unit calculates a predetermined determination value from the role and trajectory of the aircraft 40 which is obtained by the role sharing verification processing (fourth resource management processing). In addition, the comparison unit 82 compares the determination values which are calculated by the first determination value calculation unit 76, the second determination value calculation unit 78, the third determination value calculation unit 80, and the fourth determination value processing unit, and outputs the role and trajectory of the most preferable aircraft 40.

In addition, without using all results of the first to fourth resource management processing, in the roles of the aircraft 40 and the trajectories of the aircraft 40 obtained by at least two of the first to the fourth resource management processing, one role and one trajectory may be determined as the roles of the aircraft 40 and the trajectories of the aircraft 40.

Heretofore, the present invention is described using the embodiments. However, the technical range of the present invention is not limited to the described scope of the embodiments. Various modifications and improvements may be added to the embodiments within a scope which does not depart from the gist of the present invention, and the aspects to which the modifications and improvements are added are also included in the technical range of the present invention.

For example, in the embodiments, the aspect in which the role determination processing and the trajectory determination processing are performed by the aircraft 40 is described. However, the present invention is not limited to this, the role determination processing and the trajectory determination processing may be distributed and processed by all aircraft 40 in a formation, and an aspect in which the ground equipment receiving various pieces of information from the aircraft 40 performs the role determination processing and the trajectory determination processing and transmits the determined role and trajectory of the aircraft 40 to each aircraft 40 may be adopted.

Moreover, flows of the role determination processing and the trajectory determination processing described in the embodiments are examples, an unnecessary step may be removed within the scope which does not depart from the gist of the present invention, and a new step may be added or the processing procedures may be changed.

REFERENCE SIGNS LIST

10: aircraft control device
12: CPU
22: transmitting unit
40: aircraft
42: target aircraft
44: missile

The invention claimed is:

1. An aircraft control device which obtains roles of a plurality of aircraft in a formation and trajectories of the plurality of aircraft, the aircraft control device comprising:
a processing unit configured to determine, on the basis of relative positional relations between the plurality of aircraft and a target aircraft, a role of an individual one of the plurality of aircraft with respect to the target aircraft, and a trajectory of the individual one of the plurality of aircraft based on control operations determined according to the role of the individual one of the plurality of aircraft; and
a transmitting unit configured to transmit the role of the individual one of the plurality of aircraft and the trajectory of the individual one of the plurality of aircraft determined by the processing unit to the individual one of the plurality of aircraft, wherein the processing unit is configured to determine the role of the individual one of the plurality of aircraft by first determination processing, second determination processing, or third determination processing or the processing unit is configured to determine the role of the individual one of the plurality of aircraft and the trajectory of the individual one of the plurality of aircraft by fourth determination processing, wherein, in the first determination processing, the role of the individual one of the plurality of aircraft is determined, according to an evaluation value based on an azimuth angle between the individual one of the plurality of aircraft and the target aircraft, wherein, in the second determination processing, one of a plurality of rules, which corresponds to the relative positional relations between the individual one of the plurality of aircraft and the target aircraft is selected from storage configured to store the plurality of rules, which corresponds to the relative positional relations between the individual one of the plurality of aircraft and the target aircraft, and the role of the individual one of the plurality of aircraft is determined from the one of the plurality of rules, wherein, in the third determination processing, the role of the individual one of the plurality of aircraft with respect to the target aircraft is represented by a numerical value, the role of the individual one of the plurality of aircraft is changed a plurality of times by changing the numerical value, an evaluation value indicating superiority of the individual one of the plurality of aircraft with respect to the target aircraft is calculated based on the role of the individual one of the plurality of aircraft every time the role of the individual one of the plurality of aircraft is changed, and the role of the individual one of the plurality of aircraft is determined from the evaluation value, and wherein, in the fourth determination processing, a battle simulation in which a battle between the plurality of aircraft and the target aircraft is simulated is performed every time the roles of the plurality of aircraft with respect to the target aircraft are combined, and the role of the individual one of the plurality of aircraft and the trajectory of the individual one of the plurality of aircraft are determined based on an evaluation value which is obtained from a result of the battle simulation and indicates superiority of the individual one of the plurality of aircraft with respect to the target aircraft.

2. The aircraft control device according to claim 1, wherein the processing unit is configured to determine the role of the individual one of the plurality of aircraft by the first determination processing, and wherein the first determination processing applies a high evaluation value as a role of projecting a missile if the individual one of the plurality of aircraft is an aircraft in which an amount of change of the azimuth angle required for opposing the individual one of the plurality of aircraft to the target aircraft is small, applies a high evaluation value as a role of guiding the missile if the individual one of the plurality of aircraft is an aircraft in which the target aircraft and the missile are positioned near an end of a guidance range of the missile, and applies a high evaluation value as a role of detecting or tracking the target aircraft if the individual one of the plurality of aircraft is an aircraft in which the target aircraft is positioned near an end of an enemy detection range of the individual one of the plurality of aircraft.

3. The aircraft control device according to claim 1, wherein the processing unit is configured to determine the role of the individual one of the plurality of aircraft by the second determination processing, and wherein the one of the plurality of rules indicates the role of the individual one of the plurality of aircraft, which corresponds to the relative positional relations between the individual one of the plurality of aircraft and the target aircraft and an index which indicates whether or not a missile reaches the target aircraft.

4. The aircraft control device according to claim 1, wherein the processing unit is configured to determine the role of the individual one of the plurality of aircraft by the second determination processing, and wherein the one of the plurality of rules indicates the role of the individual one of the plurality of aircraft using a common name which does not specify each of the plurality of aircraft and the target aircraft without using a proper name which specifies the individual one of the plurality of aircraft and the target aircraft.

5. The aircraft control device according to claim 1, wherein the processing unit is configured to determine the role of the individual one of the plurality of aircraft by the second determination processing, and wherein the one of the plurality of rules is not only randomly generated but is also arbitrarily generated in consideration of determination of a pilot of the individual one of the plurality of aircraft.

6. The aircraft control device according to claim 1, wherein the processing unit is configured to determine the role of the individual one of the plurality of aircraft by the second determination processing, wherein the battle simulation in which the battle between the plurality of aircraft and the target aircraft is simulated is performed by continuously using the plurality of rules before being stored in the storage along with elapsed times, and wherein, according to the one of the plurality of rules used in the battle simulation, a score corresponding to achievement of a predetermined event in the battle simulation is added to the evaluation value of the one of the plurality of rules, and the one of the plurality of rules stored in the storage is determined based on the evaluation value.

7. The aircraft control device according to claim 6, wherein the score with respect to the one of the plurality of rules in which the predetermined event in the battle simulation is achieved is gradient-distributed in one of the plurality of rules which is used to reach the one of the plurality of rules in which the predetermined event in the battle simulation is achieved.

8. The aircraft control device according to claim 1, wherein the processing unit is configured to determine the role of the individual one of the plurality of aircraft by the second determination processing, wherein early generation creation processing is performed in which aggregations of a predetermined number of the plurality of rules are set to an individual one of the plurality of aircraft, and a predetermined number of individual ones of the plurality of aircraft is generated as an early generation, wherein evaluation value calculation processing is performed in which an evaluation value indicating superiority of the individual one of the plurality of aircraft with respect to the target aircraft is calculated for each individual one of the plurality of aircraft based on the trajectory of the individual one of the plurality of aircraft determined by the battle simulation in which the battle between the plurality of aircraft and the target aircraft is simulated using the predetermined number of the plurality of rules, wherein the evaluation value calculation processing is performed every time the one of the plurality of rules configuring the individual ones of the plurality of aircraft is changed and a new generation is set, and wherein when the change of the one of the plurality of rules reaches a predetermined generation, the one of the plurality of rules stored in the storage is determined based on the individual one of the plurality of aircraft having the highest evaluation value.

9. The aircraft control device according to claim 8, wherein elimination and addition are performed based on the battle simulation in the one of the plurality of rules configuring the individual ones of the plurality of aircraft.

10. The aircraft control device according to claim 9, wherein when two individual ones of the plurality of aircraft are intersected to change the one of the plurality of rules configuring the individual ones of the plurality of aircraft, the intersection is performed based on one of the two individual ones of the plurality of aircraft in which the predetermined number of the plurality of rules is smaller.

11. The aircraft control device according to claim 1, wherein the processing unit is configured to determine the role of the individual one of the plurality of aircraft by the third determination processing, and wherein in the third determination processing, the role of the individual one of the plurality of aircraft and an initial disposition position of the individual one of the plurality of aircraft with respect to the target aircraft are represented by a numerical value, the role of the individual one of the plurality of aircraft and the initial disposition position of the individual one of the plurality of aircraft are changed by changing the numerical value, and the evaluation value is calculated every time the role of the individual one of the plurality of aircraft and the initial disposition position of the individual one of the plurality of aircraft are changed.

12. The aircraft control device according to claim 1, wherein the processing unit is configured to determine the role of the individual one of the plurality of aircraft by the third determination processing, and wherein in the third determination processing, the role of the individual one of the plurality of aircraft and the trajectory of the individual one of the plurality of aircraft are determined for each predetermined time interval.

13. The aircraft control device according to claim 1, wherein the processing unit is configured to determine the role of the individual one of the plurality of aircraft by the third determination processing, and wherein the evaluation value is calculated based on an estimation result of a trajectory of the target aircraft.

14. The aircraft control device according to claim 1, wherein the processing unit is configured to determine the role of the individual one of the plurality of aircraft by the fourth determination processing, and wherein the processing unit is configured to perform the fourth determination processing so that only a predetermined number of the plurality of aircraft corresponds to a predetermined number of target aircraft corresponding to a threat level when a required time of the battle simulation for combinations of all the roles of the plurality of aircraft does not end within a predetermined time.

15. An aircraft control device which obtains roles of a plurality of aircraft in a formation and trajectories of the plurality of aircraft, the aircraft control device comprising:

a processing unit configured to determine, on the basis of relative positional relations between the plurality of aircraft and a target aircraft, a role of an individual one of the plurality of aircraft with respect to the target aircraft, and a trajectory of the individual one of the plurality of aircraft based on control operations determined according to the role of the individual one of the plurality of aircraft; and a transmitting unit configured to transmit the role of the individual one of the plurality of aircraft and the trajectory of the individual one of the plurality of aircraft determined by the processing unit to the individual one of the plurality of aircraft, wherein the processing unit is configured to determine one role and one trajectory, as the role of the individual one of the plurality of aircraft and the trajectory of the individual one of the plurality of aircraft, among the roles of the plurality of aircraft and the trajectories of the plurality of aircraft obtained by at least two of the following:

i) a first determination processing in which the role of the individual one of the plurality of aircraft is determined, according to an evaluation value based on an azimuth angle between the individual one of the plurality of aircraft and the target aircraft;

ii) a second determination processing in which the one of a plurality of rules, which corresponds to relative positional relations between the individual one of the plurality of aircraft and the target aircraft is selected from storage configured to store the plurality of rules which indicates the role of the individual one of the plurality of aircraft, which corresponds to the relative positional relations between the individual one of the plurality of aircraft and the target aircraft, and the role of the individual one of the plurality of aircraft is determined from the one of the plurality of rules;

iii) a third determination in which the role of the individual one of the plurality of aircraft with respect to the target aircraft is represented by a numerical value, the role of the individual one of the plurality of aircraft is changed a plurality of times by changing the numerical value, an evaluation value indicating superiority of the individual one of the plurality of aircraft with respect to the target aircraft is calculated based on the role of the individual one of the plurality of aircraft every time the role of the individual one of the plurality of aircraft is changed, and the role of the individual one of the plurality of aircraft is determined from the evaluation value; and iv) a fourth determination processing in which a battle simulation in which a battle between the plurality of aircraft and the target aircraft is simulated is performed every time the roles of the plurality of aircraft with respect to the target aircraft are combined, and the role of the individual one of the plurality of aircraft and the trajectory of the individual one of the plurality of aircraft are determined based on an evaluation value which is obtained from a result of the battle simulation and indicates superiority of the individual one of the plurality of aircraft with respect to the target aircraft.

16. An aircraft comprising the aircraft control device according to claim 1.

17. A method for controlling an individual one of a plurality of aircraft which obtains roles of the plurality of aircraft in a formation and trajectories of the plurality of aircraft, the method comprising:
- determining, using a processor, on the basis of relative positional relations between the individual one of the plurality of aircraft and a target aircraft, (i) a role of the individual one of the plurality of aircraft with respect to the target aircraft and (ii) a trajectory of the individual one of the plurality of aircraft based on control operations determined according to the role of the individual one of the plurality of aircraft;
- transmitting the determined role and the determined trajectory of the individual one of the plurality of aircraft to the individual one of the plurality of aircraft; and
- determining the role of the individual one of the plurality of aircraft by first determination processing, second determination processing, or third determination processing or determining the role of the individual one of the plurality of aircraft and the trajectory of the individual one of the plurality of aircraft by fourth determination processing,
- wherein, in the first determination processing, the role of the individual one of the plurality of aircraft is determined, according to an evaluation value based on an azimuth angle between the individual one of the plurality of aircraft and the target aircraft,
- wherein, in the second determination processing, one of a plurality of rules, which corresponds to relative positional relations between the individual one of the plurality of aircraft and the target aircraft is selected from storage configured to store the plurality of rules, which corresponds to the relative positional relations between the individual one of the plurality of aircraft and the target aircraft, and the role of the individual one of the plurality of aircraft is determined from the one of the plurality of rules,
- wherein, in the third determination processing, the role of the individual one of the plurality of aircraft with respect to the target aircraft is represented by a numerical value, the role of the individual one of the plurality of aircraft is changed a plurality of times by changing the numerical value, an evaluation value indicating superiority of the individual one of the plurality of aircraft with respect to the target aircraft is calculated based on the role of the individual one of the plurality of aircraft every time the role of the individual one of the plurality of aircraft is changed, and the role of the individual one of the plurality of aircraft is determined from the evaluation value, and
- wherein, in the fourth determination processing, a battle simulation in which a battle between the plurality of aircraft and the target aircraft is simulated is performed every time the roles of the plurality of aircraft with respect to the target aircraft are combined, and the role of the individual one of the plurality of aircraft and the trajectory of the individual one of the plurality of aircraft are determined based on an evaluation value which is obtained from a result of the battle simulation and indicates superiority of the individual one of the plurality of aircraft with respect to the target aircraft.

* * * * *